United States Patent
Watanabe et al.

(10) Patent No.: US 6,947,594 B2
(45) Date of Patent: Sep. 20, 2005

(54) IMAGE PROCESSING METHOD AND SYSTEMS

(75) Inventors: Masahiro Watanabe, Kawasaki (JP); Koichi Fujimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 09/994,760

(22) Filed: Nov. 28, 2001

(65) Prior Publication Data

US 2003/0053689 A1 Mar. 20, 2003

(30) Foreign Application Priority Data

Aug. 27, 2001 (JP) ........................................ 2001-256095

(51) Int. Cl.[7] .............................................. G06K 9/00
(52) U.S. Cl. ....................................... 382/167; 382/164
(58) Field of Search ................................ 382/162, 164, 382/165, 167, 173, 228, 274; 358/1.9, 504, 509, 515, 518, 523, 520, 530; 345/589, 590, 600

(56) References Cited

U.S. PATENT DOCUMENTS

| | | | | |
|---|---|---|---|---|
| 6,097,836 A | * | 8/2000 | Inoue | 382/165 |
| 6,151,410 A | * | 11/2000 | Kuwata et al. | 382/167 |
| 6,346,994 B1 | * | 2/2002 | Inoue | 358/1.9 |
| 6,628,825 B1 | * | 9/2003 | Yamazoe et al. | 382/167 |
| 6,775,408 B1 | * | 8/2004 | Masaki | 382/167 |
| 2003/0103671 A1 | * | 6/2003 | Matsuura | 382/173 |

FOREIGN PATENT DOCUMENTS

| | | | |
|---|---|---|---|
| JP | 08-032827 | 2/1996 | H04N/1/60 |
| JP | 08-062741 | 3/1996 | G03B/27/80 |
| JP | 2000-013626 | 1/2000 | H04N/1/60 |

* cited by examiner

*Primary Examiner*—Andrew W. Johns
*Assistant Examiner*—Amir Alavi
(74) *Attorney, Agent, or Firm*—Staas & Halsey LLP

(57) ABSTRACT

This invention provides a novel image correcting technique for automatically carrying out a suitable image correction. An image processing program of the invention includes a correction front-end unit for carrying out a color balance correction, a range correction, a main portion estimation processing, and a tone correction, a statistical information calculation unit for generating a color saturation reference value and a contour reference value as data expressing the preference of an operator by using an output of the correction front-end unit and a manually corrected image, and a correction back-end unit for carrying out a color saturation correction processing using the color saturation reference value stored in a reference value DB and a contour emphasis processing using the contour reference value. A processing result of the correction back-end unit is stored as an output image into an image storage DB.

24 Claims, 34 Drawing Sheets

| REGION | HI/sd FLAG | HUE RANGE | LIGHTNESS RANGE | LIGHTNESS AT MAXIMUM COLOR SATURATION | PIXEL COUNT | MAXIMUM PIXEL COUNT FLAG | AVERAGE COLOR SATURATION HUa/HLa | AVERAGE CONVERTED COLOR SATURATION CUa/CLa |
|---|---|---|---|---|---|---|---|---|
| 1 | 1 | 000, 060 | 127, 255 | 136 | 0200 | 01 | 30 | 10 |
| 2 | 2 | 000, 060 | 000, 127 | 136 | 0030 | — | — | — |
| 3 | 1 | 060, 120 | 127, 255 | 248 | 0060 | — | — | — |
| 4 | 2 | 060, 120 | 000, 127 | 248 | 0070 | — | — | — |
| 5 | 1 | 120, 180 | 127, 255 | 224 | 0040 | — | — | — |
| 6 | 2 | 120, 180 | 000, 127 | 224 | 0300 | 02 | 150 | 5 |
| 7 | 1 | 180, 240 | 127, 255 | 232 | 0040 | — | — | — |
| 8 | 2 | 180, 240 | 000, 127 | 232 | 0050 | — | — | — |
| 9 | 1 | 240, 300 | 127, 255 | 82 | 0060 | — | — | — |
| 10 | 2 | 240, 300 | 000, 127 | 82 | 0030 | — | — | — |
| 11 | 1 | 300, 360 | 127, 255 | 154 | 0050 | — | — | — |
| 12 | 2 | 300, 360 | 000, 127 | 154 | 0070 | — | — | — |

FIG. 8

| PIXEL IDENTIFIER 1100 | LIGHTNESS L 1101 | COLOR SATURATION C 1102 | HUE H 1103 | REGION 1104 | HI/sd FLAG 1105 | CONVERTED COLOR SATURATION CU/CL 1106 | HUE HU/HL 1107 | CORRECTED COLOR SATURATION CC 1108 |
|---|---|---|---|---|---|---|---|---|
| 0001 | 200 | 15 | 30 | 1 | 1 | 8.1 | 30 | 5 |
| 0002 | 60 | 8 | 185 | 7 | 2 | — | — | 3.9 |
| 0003 | 180 | 57 | 350 | — | — | — | — | 49.3 |
| 0004 | 152 | 9 | 46 | 1 | 1 | — | — | 0 |
| 0005 | 32 | 10 | 270 | 6 | 2 | 6.1 | 270 | 12.5 |
| — | — | — | — | — | — | — | — | — |
| 1000 | 150 | 17 | 52 | 1 | 1 | 2.0 | 52 | 7.7 |

FIG. 11

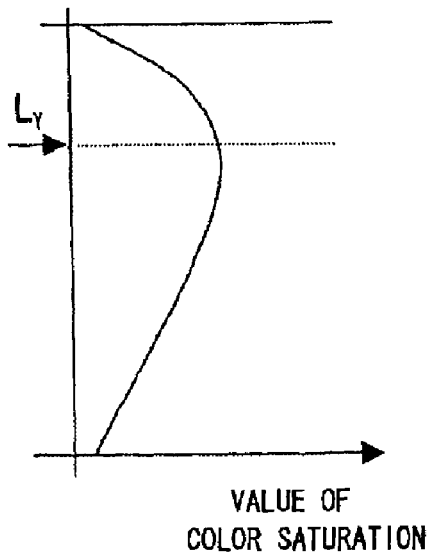 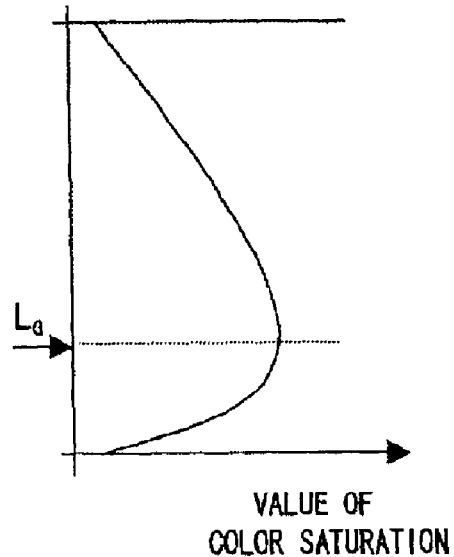
FIG. 12
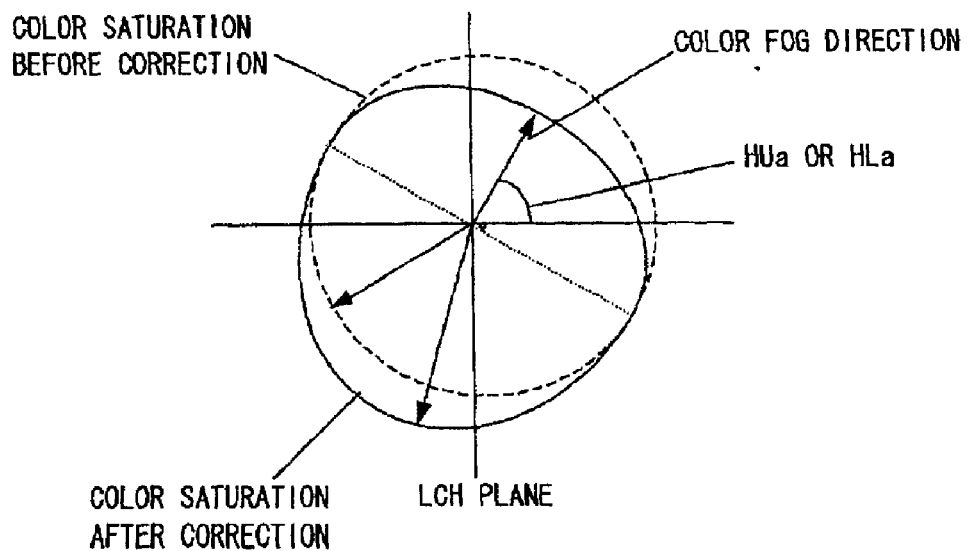
FIG. 14

| TYPE | PIXEL IDENTIFIER 1601 | RED HR/SR 1602 | GREEN HG/SG 1603 | BLUE HB/SB 1604 | DEFINITION VALUE Hdef Sdef 1605 | COEFFICIENT A/B 1606 | CORRECTED RED HR'/SR' 1607 | CORRECTED GREEN HG'/SG' 1608 | CORRECTED BLUE HB'/SB' 1609 |
|---|---|---|---|---|---|---|---|---|---|
| HL | 0100 | 220 | 200 | 180 | 255 | 1.16 | 255 | 232 | 209 |
| SD | 0600 | 30 | 50 | 70 | 0 | 1.13 | 0 | 23 | 46 |

| 1700 | 1701 | 1702 | 1703 | 1704 | 1705 | 1706 |
|---|---|---|---|---|---|---|
| PIXEL IDENTIFIER | RED R | GREEN G | BLUE B | CORRECTED RED R' | CORRECTED GREEN G' | CORRECTED BLUE B' |
| 0001 | 204 | 191 | 189 | 209 | 195 | 193 |
| 0002 | 49 | 58 | 56 | 43 | 53 | 51 |
| 0003 | 249 | 137 | 189 | 255 | 140 | 193 |
| ⋮ | ⋮ | ⋮ | ⋮ | ⋮ | ⋮ | ⋮ |
| 1000 | 154 | 138 | 131 | 157 | 141 | 134 |

FIG. 17

| 2500 | 2501 | 2502 |
|---|---|---|
| TYPE | COLOR SATURATION RANGE C | HUE RANGE H |
| HUMAN SKIN HS | EQUAL TO OR MORE THAN 8 | 30° TO 60° |
| BLUE SKY SK | EQUAL TO OR MORE THAN 8 | 170° TO 280° |
| WHITE CLOUD CL | EQUAL TO OR LESS THAN 8 | NO CONDITION |

FIG. 25

| R COMPONENT VALUE X OF INPUT PIXEL | R COMPONENT VALUE Y OF OUTPUT PIXEL |
|---|---|
| 0 | 0 |
| 1 | 0 |
| 2 | 0 |
| ... | ... |
| 126 | 129 |
| 127 | 130 |
| 128 | 131 |
| ... | ... |
| 253 | 255 |
| 254 | 255 |
| 255 | 255 |

| G COMPONENT VALUE X OF INPUT PIXEL | G COMPONENT VALUE Y OF OUTPUT PIXEL |
|---|---|
| 0 | 0 |
| 1 | 0 |
| 2 | 0 |
| ... | ... |
| 126 | 152 |
| 127 | 153 |
| 128 | 155 |
| ... | ... |
| 253 | 255 |
| 254 | 255 |
| 255 | 255 |

FIG. 21

| B COMPONENT VALUE X OF INPUT PIXEL | B COMPONENT VALUE Y OF OUTPUT PIXEL |
|---|---|
| 0 | 0 |
| 1 | 0 |
| 2 | 0 |
| ... | ... |
| 126 | 152 |
| 127 | 153 |
| 128 | 155 |
| ... | ... |
| 253 | 255 |
| 254 | 255 |
| 255 | 255 |

FIG. 22

| REGION Am | OBJECTIVE PIXEL 2401 | NUMBER OF PIXELS 2402 | HUMAN SKIN PIXEL COUNT HS 2403 | BLUE SKY PIXEL COUNT SK 2404 | WHITE CLOUD PIXEL COUNT CL 2405 | AVERAGE LIGHTNESS La 2406 | HUMAN SKIN PIXEL RATE HSm 2407 | BLUE SKY PIXEL RATE SKm 2408 | WHITE CLOUD PIXEL RATE CLm 2409 | REFERENCE LEVEL Rm 2410 |
|---|---|---|---|---|---|---|---|---|---|---|
| 01 | 0001,0111 | 111 | 63 | 20 | 17 | 150 | 0.58 | 0.18 | 0.15 | 0.5 |
| 02 | 0112,0222 | 111 | 63 | 20 | 17 | 150 | 0.58 | 0.18 | 0.15 | 0.5 |
| 03 | 0223,0333 | 111 | 71 | 16 | 13 | 100 | 0.63 | 0.14 | 0.12 | 1.0 |
| 04 | 0334,0444 | 111 | 71 | 0 | 0 | 100 | 0.63 | 0 | 0 | 1.0 |
| 05 | 0445,0555 | 111 | 63 | 5 | 0 | 70 | 0.58 | 0.05 | 0 | 0.5 |
| 06 | 0556,0666 | 111 | 71 | 0 | 0 | 100 | 0.63 | 0 | 0 | 1.0 |
| 07 | 0667,0777 | 111 | 71 | 0 | 0 | 100 | 0.63 | 0 | 0 | 1.0 |
| 08 | 0778,0888 | 111 | 63 | 0 | 0 | 70 | 0.58 | 0 | 0 | 0.5 |
| 09 | 0889,1000 | 112 | 63 | 0 | 0 | 70 | 0.58 | 0 | 0 | 0.5 |

FIG. 24

| TYPE | VALUE |
|---|---|
| REFERENCE VALUE OF HUMAN SKIN PIXEL RATE HSdef | 0.50 |
| REFERENCE VALUE OF STANDARD DEVIATION OF HUMAN SKIN PIXEL RATE HSdevK | 0.20 |
| REFERENCE VALUE OF STANDARD DEVIATION OF AVERAGE LIGHTNESS (La) LadevK | 19.0 |
| REFERENCE VALUE OF BLUE SKY PIXEL RATE SKdef | 0.50 |
| REFERENCE VALUE OF WHITE CLOUD PIXEL RATE CLdef | 0.50 |

FIG. 26

| TYPE | VALUE |
|---|---|
| AVERAGE VALUE OF HUMAN SKIN PIXEL RATE (HSm) HSa | 0.60 |
| STANDARD DEVIATION OF HUMAN SKIN PIXEL RATE (HSm) HSdev | 0.10 |
| AVERAGE VALUE OF AVERAGE LIGHTNESSES (La) allLa | 101.1 |
| STANDARD DEVIATION OF AVERAGE LIGHTNESSES (La) Ladev | 29.2 |

FIG. 27

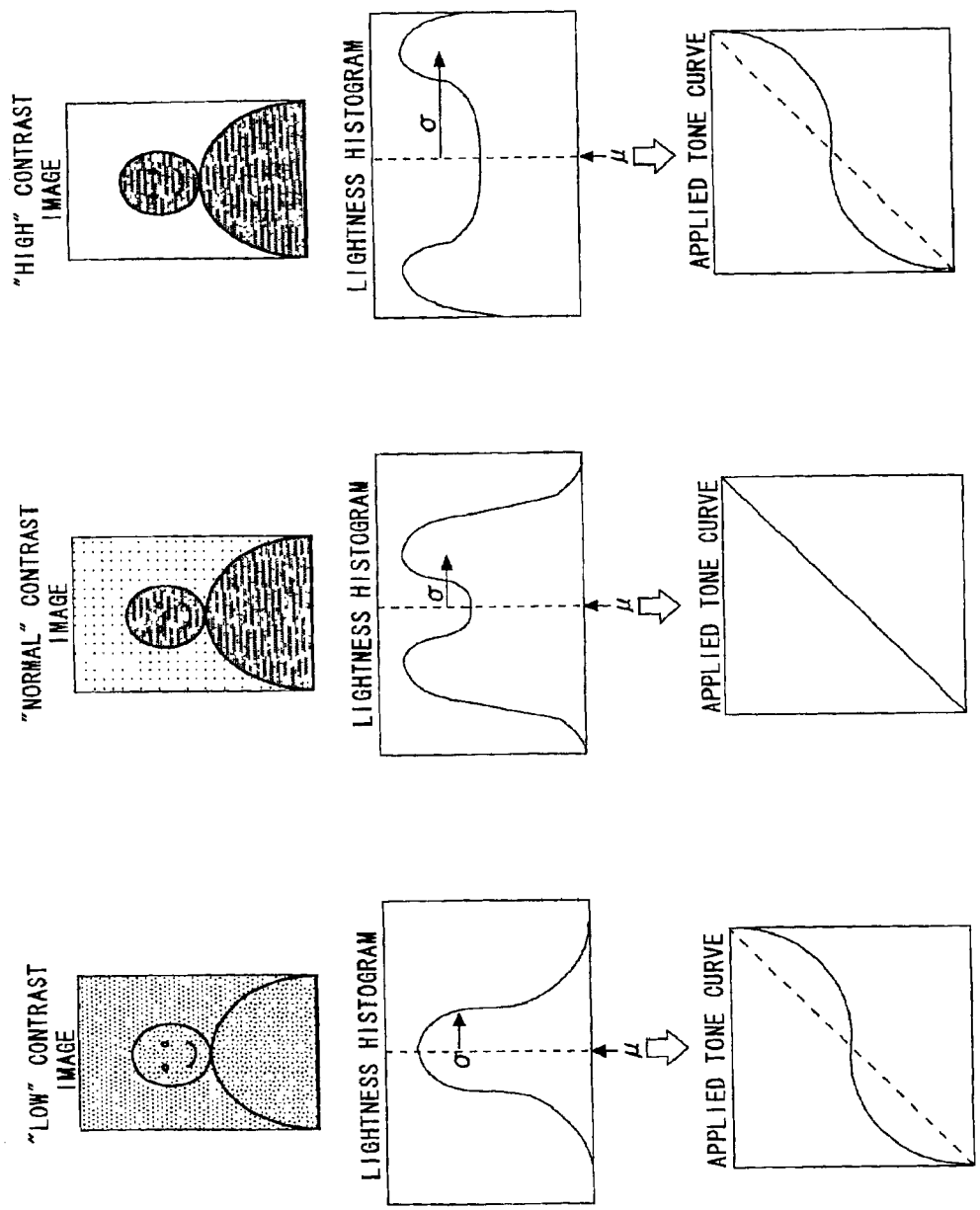

| 3500 | 3501 | 3502 | 3503 |
|---|---|---|---|
| PIXEL IDENTIFIER | LIGHTNESS Te-L | COLOR SATURATION Te-C | DIFFERENCE ABSOLUTE VALUE \|L\| OF LIGHTNESS BETWEEN PIXEL OF FRONT-END CORRECTED IMAGE AND PIXEL OF MANUALLY CORRECTED IMAGE |
| 0001 | 150 | 20 | 30 |
| 0002 | 80 | 40 | 20 |
| 0003 | 190 | 30 | 0 |
| ⋮ | ⋮ | ⋮ | ⋮ |
| 1000 | 50 | 150 | 15 |

| 3600 | 3601 | 3602 |
| --- | --- | --- |
| HISTORY NUMBER | AVERAGE VALUE (Te-Ca) OF Te-C | AVERAGE VALUE (\|L\|a) OF \|L\| |
| 0001 | 20 | 20 |
| 0002 | 30 | 15 |
| ⋮ | ⋮ | ⋮ |
| 0100 | 25 | 30 |

FIG. 36

| 3700 | 3701 |
| --- | --- |
| Te-al\|Ca | al\|\|L\|a |
| 25 | 22 |

FIG. 37

IMAGE PROCESSING METHOD AND SYSTEMS

TECHNICAL FIELD OF THE INVENTION

The present invention relates to an image processing technique, and more particularly to an automatic image correcting technique.

BACKGROUND OF THE INVENTION

Conventionally, an operator having knowledge about an image correction manually carries out various kinds of corrections on an obtained image by trial and error to make an improvement in image quality. There are various kinds of image corrections, for example, a color balance correction for removing, when the entire image is colored and a color deviation exists wholly, the deviation, a range correction for adjusting a range of pixel values which can be taken, a tone correction for adjusting the brightness and contrast of a pixel, a color saturation correction for adjusting the vividness of an image, a contour emphasis correction for improving the sharpness of an image, and the like.

In a conventional technique of the color balance correction, mostly, a correction reference and a correction amount of color fog are estimated, and the estimated correction amount is uniformly used for the entire hue of an image to carry out the correction. However, for example, since the distribution of color saturation values is greatly different between the hue region of a Y system and the hue region of a G system, there has been a problem that if the correction amount is estimated from the whole color space in accordance with such a method, the accuracy is remarkably lowered.

Besides, for example, Japanese Patent Unexamined Publication No. 2000-13626 discloses a technique as follows: That is, when a color balance correction is made on a pixel of an input image, a correction amount is adjusted with the weight of a difference between a hue as a reference of the correction and a phase value of a pixel, and an estimated correction amount is uniformly used for the whole hue of the image. For example, as shown in FIG. 44, in the case where a dotted line indicates a color distribution before the correction on an LCH (lightness, color saturation, hue) plane, and an arrow indicates a color fog direction, when the technique disclosed in the publication is used, the color distribution before the correction is moved to a position as indicated by a solid line as it is. However, since a color region A which is not originally subjected to color fogging is also moved to a position of a region A', there has been a defect that the color saturation/hue are greatly changed, and the color of the image is partially faded or blurred.

With respect to the range correction, the following method has been conventionally used. That is, a desired highlight pixel value and a shadow pixel value are determined in advance, and a highlight pixel which is a pixel having highest lightness and a shadow pixel which is a pixel having lowest lightness are searched from an input image. A pixel value of the searched highlight pixel is converted to a highlight pixel value, and a pixel value of the searched shadow pixel is converted to a shadow pixel value, and with respect to a pixel having a pixel value between the value of the searched highlight pixel and the value of the shadow pixel, a linear proportional calculation is made and it is converted to a pixel value between the highlight pixel value and the shadow pixel value.

If an input image is a monochromatic image having only lightness, the above method does not have any problem, however, in the case of a color image, a problem has arisen since a color balance is not considered. That is, when an image is expressed by RGB (red, green and blue of the three primary colors of light) and the range correction is made on the respective components of the RGB in accordance with the above method, in the case where a pixel having a color, for example, a highlight pixel, which is yellow (when expressed by pixel values, (RGB)=(200, 200, 100)), there occurs such a phenomenon that the pixel value of each of the RGB becomes high (RGB=(255, 255, 255)) and the color becomes white.

Thus, in order to keep the color balance, although there is a method for making the range correction while the ratio of the RGB is kept, in the case where the pixel value of the shadow pixel has a rather high pixel value (clear red (for example, RGB=(200, 150, 150)) in pixel values which can be taken, since a difference between the respective components of the RGB becomes small if the ratio of the RGB is merely kept, there has been a case where the sharpness of the input image is faded, for example, the clear red becomes faded red (RGB=(100, 75, 75)).

Besides, for example, Japanese Patent Unexamined Publication No. Hei. 8-32827 discloses a method in which in the case where an object of a range correction is a color image, the color image is converted into an LCH format, and the range correction is made as to L and C. In this case, since a pixel value may go out of a color space, which is allowed, color range compression is carried out to push the pixel value into a predetermined color space. In this method, although the range correction is enabled while the color balance is kept, there is a problem that it is judged whether a pixel after the range correction is in the predetermined color space, and if not, an operation of pushing the pixel value into the color space becomes necessary in surplus. Besides, in recent years, an image photographing apparatus such as a digital camera becomes popular, and there are many cases where an input image is expressed in RGB, and in the case where the method as disclosed in the publication is used, the cost of conversion of the RGB into the LCH is also needed in surplus.

Besides, with respect to an image which is not suitable in brightness and contrast, if the input image is an image in which a person is a main body, it is desirable that an image processing by a gradation correction curve or the like is carried out to adjust the brightness/gradation of a person portion, and in a case of an image in a backlight state, it is desirable that a gradation correction is carried out to adjust the brightness/gradation of a portion which becomes rather black by backlight. For example, Japanese Patent No. 3018914 discloses a method of recognizing a main portion of an image and correcting a gradation. That is, an image is divided into a plurality of small regions, and an analysis of a person and an analysis of backlight are carried out, so that the input image is classified into four types (combinations of presence/non-presence of a person and presence/non-presence of a backlight), and a person degree and a backlight degree of the entire image are calculated. Besides, a previously obtained weight value (person reliability, backlight reliability, and reliability of other images) is acquired, models of previously obtained three types of gradation correction curves (for person correction, for backlight correction, and for correction of other images) and weight values are subjected to a product-sum calculation, and a final gradation correction curve is calculated. However, in this method, since by estimating the degree of the person or the backlight with respect to the whole image, the gradation correction curve is prepared, even if the input image is divided into the small regions and the image analysis is carried out with considerable effort, the portion of the person or the backlight is not specified. Accordingly, even if the image is judged to be the person or the backlight, there occurs a case where with respect to the image in which brightness or contrast is not suitable, the portion of the person or the backlight is not corrected to a desired gradation.

Besides, in recent years, although a technique of automating the operations of an operator has been developed, since the correction is carried out uniformly without giving attention to the preference and tendency of the operator at the time of the image correction, there occurs a case where the result of an automatic image correction, such as a color saturation correction or a contour emphasis correction, becomes greatly different from the object of the operator.

As described above, conventionally, there has not been a suitable automatic image correcting technique.

SUMMARY OF THE INVENTION

An object of the present invention is therefore to provide a novel image correcting technique for automatically carrying out a suitable image correction.

Another object of the present invention is to provide a novel image correcting technique for automatically carrying out a more accurate image correction.

According to a first aspect of the present invention, a method of correcting a color fog as to an input image comprises the steps of: calculating a statistical amount (for example, an average value in an embodiment; a model value or the like may be adopted) as to color saturation components of at least one group of pixels included in a reference hue region of a plurality of hue regions generated by dividing a hue region, wherein color saturation components are weighted by the magnitude of lightness components of at least one group of pixels, and setting the statistical amount as a correction reference value of the color fog; and carrying out a correction of the color fog as to each pixel of the input image by using the correction reference value.

By this, it becomes possible to automatically carry out a highly accurate color balance correction. That is, in the first aspect of the invention, all pixels of the input image are not used for calculation of the correction reference value of the color fog, but only the pixels included in the reference hue region are used, so that data as to pixels which are not desirable for calculation of the correction reference value can be removed, and the accuracy of the correction reference value is improved. Besides, since the color saturation component weighted by the magnitude of the lightness component of the pixel is used, for example, lightweight can be given to a pixel which is not desirable for the calculation of the correction reference value and heavy weight can be given to a desirable pixel, so that the accuracy of the correction reference value is further improved.

According to a second aspect of the present invention, a method of carrying out a range correction as to an input image comprises the steps of: detecting a highlight pixel having highest lightness and a shadow pixel having lowest lightness from pixels included in the input image; converting values of respective color components of the highlight pixel in accordance with a specified maximum gradation value so as not to change a ratio of gradation differences between the values of the respective color components of the highlight pixel and lowest values which the respective color components can take; converting values of respective color components of the shadow pixel in accordance with a specified minimum gradation value so as not to change a ratio of gradation differences between the values of the respective color components of the shadow pixel and highest values which the respective color components can take; and as to each of the color components, linearly converting a value of the color component of each pixel of the input image, contained in a range from a value of the color component as to the shadow pixel before the conversion, to a value of the color component as to the highlight pixel before the conversion to a value in a range from a value of the color component as to the shadow pixel after the conversion to a value of the color component as to the highlight pixel after the conversion.

By this, it becomes possible to automatically carry out the suitable range correction. Like this, the values of the respective color components of the highlight pixel are converted in accordance with the specified maximum gradation value so as not to change the ratio of the gradation differences between the values of the respective color components of the highlight pixel and the lowest values which the respective color components can take, and the values of the respective components of the shadow pixel are converted in accordance with the specified minimum gradation value so as not to change the ratio of the gradation differences between the values of the respective color components of the shadow pixel and the highest values which the respective color components can take, so that the highlight pixel and the shadow pixel become lively after the correction, and remaining pixels can be put in a specified range without a pushing processing.

According to a third aspect of the present invention, an image processing method for specifying a noticeable portion as to an input image comprises the steps of: dividing the input image into a plurality of regions; calculating, as to each of the plurality of regions, a rate of a human skin pixel by counting the human skin pixel, which is a pixel satisfying a previously set human skin condition, and calculating an average and a standard deviation of the rate of the human skin pixel as to the plurality of regions; judging presence of a region including a portion estimated to be a person on the basis of the average of the ratio of the human skin pixel; and, if it is judged that the region including the portion estimated to be the person exists, setting an importance level expressing a most noticeable portion to the region including the portion estimated to be the person, and setting an importance level lower than the importance level expressing the most noticeable portion to a region including a portion estimated to be something other than the person on the basis of a value of the standard deviation.

By this, the region including the portion estimated to be the person can be specified, and it becomes possible to change processing contents as to the region in a subsequent processing, or to give weight to the region in accordance with the importance level.

According to a fourth aspect of the present invention, an image processing method for specifying a noticeable portion as to an input image comprises the steps of: dividing the input image into a plurality of regions; as to each of the plurality of region, calculating average lightness, a rate of a sky pixel and a rate of a cloud pixel by counting the sky pixel, which is a pixel satisfying a previously set sky condition, and the cloud pixel, which is a pixel satisfying a previously set cloud condition, and calculating an average value and a standard deviation of the average lightness as to the plurality of regions; judging whether the input image is in a backlight state, on the basis of at least one of the average lightness, the average value and the standard deviation of the average lightness, and the rate of the sky pixel and the rate of the cloud pixel; and if it is judged that the input image is in the backlight state, setting an importance level expressing a most noticeable portion to a region including a portion estimated to be a dark portion due to the backlight on the basis of the average lightness and the average value of the average lightness, or a portion which is not the dark portion due to the backlight but is estimated to be something other than the cloud and the sky on the basis of the rate of the sky pixel and the rate of the cloud pixel, and setting an importance level lower than the importance level expressing the most noticeable portion to a region including other portions.

By this, it is possible to specify the portion which is considered to be important in the input image and is estimated to be the dark portion due to the backlight, and it becomes possible to change the processing contents as to the region in the subsequent processing or to give weight to the region in accordance with the importance level. More specifically, when the lightness average value and the value of the lightness standard deviation, which is the reference for determining parameters necessary for a tone correction, are calculated, weight is given in accordance with the importance level and the lightness is averaged, or the lightness standard deviation is calculated. By this, it becomes possible to carry out a more suitable tone correction.

According to a fifth aspect of the present invention, a method for correcting color saturation as to an input image comprises the steps of: calculating a statistical amount as to color saturation of each pixel of the input image and storing it into a storage device; and calculating a color saturation correction coefficient by using a color saturation correction reference value expressing a color saturation correction tendency of an operator and the statistical amount as to the color saturation, and carrying out the color saturation correction by the color saturation correction coefficient.

Like this, since the color saturation correction reference value expressing the color saturation correction tendency of the operator is used, it becomes possible to carry out the correction in accordance with the preference of the operator.

According to a sixth aspect of the present invention, a method of carrying out a contour emphasis correction as to an input image comprises the steps of: generating a smoothed image by carrying out a smoothing processing on a process image formed of lightness components of the input image; generating a difference image by calculating a difference between the process image and the smoothed image; calculating a statistical amount as to pixel values of the difference image, and storing it into a storage device; calculating a contour emphasis correction coefficient on the basis of a contour emphasis correction reference value expressing a contour emphasis correction tendency of an operator and the statistical value as to the pixel values of the difference image; and generating an output image by correcting each pixel value of the difference image by the contour emphasis correction coefficient and adding the corrected pixel value of the difference image with a value of a corresponding pixel of the process image.

Since the contour emphasis correction reference value expressing the contour emphasis correction tendency of the operator is used in this way, it becomes possible to carry out the correction in accordance with the preference of the operator.

Incidentally, the foregoing methods can be carried out through a program, and this program is stored in a storage medium or a storage device, such as a flexible disk, a CD-ROM, a magneto-optic disk, a semiconductor memory, or a hard disk. Besides, there is also a case where the program is distributed through a network or the like. Incidentally, intermediate processing results are temporarily stored in a memory.

BRIEF DESCRIPTION OF THE DRAWINGS

FIG. 8 is a diagram showing an example of a maximum color saturation table for a color balance correction;

FIG. 11 is a diagram showing an example of a pixel table for a color balance correction;

FIG. 12 is a diagram for explaining color saturation distributions of a Y system and a G system;

FIG. 14 is a diagram showing a color saturation change before and after the color balance correction;

FIG. 16 is a diagram showing an example of a range correction table for a range correction;

FIG. 17 is a diagram showing an example of a pixel table for the range correction;

FIG. 21 is a diagram showing an example of a conversion table (for green);

FIG. 22 is a diagram showing an example of a conversion table (for blue);

FIG. 24 is a diagram showing an example of a reference importance level table used in the main portion estimation processing;

FIG. 25 is a diagram showing an example of a pixel type condition table used in the main portion estimation processing;

FIG. 26 is a diagram showing an example of a reference pixel rate table used in the main portion estimation processing;

FIG. 27 is a diagram showing an example of a calculation pixel rate table used in the main portion estimation processing;

FIGS. 33A, 33B and 33C are diagrams each showing a relation among an image state, a lightness standard deviation $\sigma$, and an applied tone curve;

FIG. 36 is a diagram showing an example of a manual correction historical table for the statistical information calculation processing;

FIG. 37 is a diagram showing an example of a color saturation/contour reference table for the statistical information calculation processing;

DETAIL DESCRIPTION OF THE PREFERRED EMBODIMENTS

Figure 1:
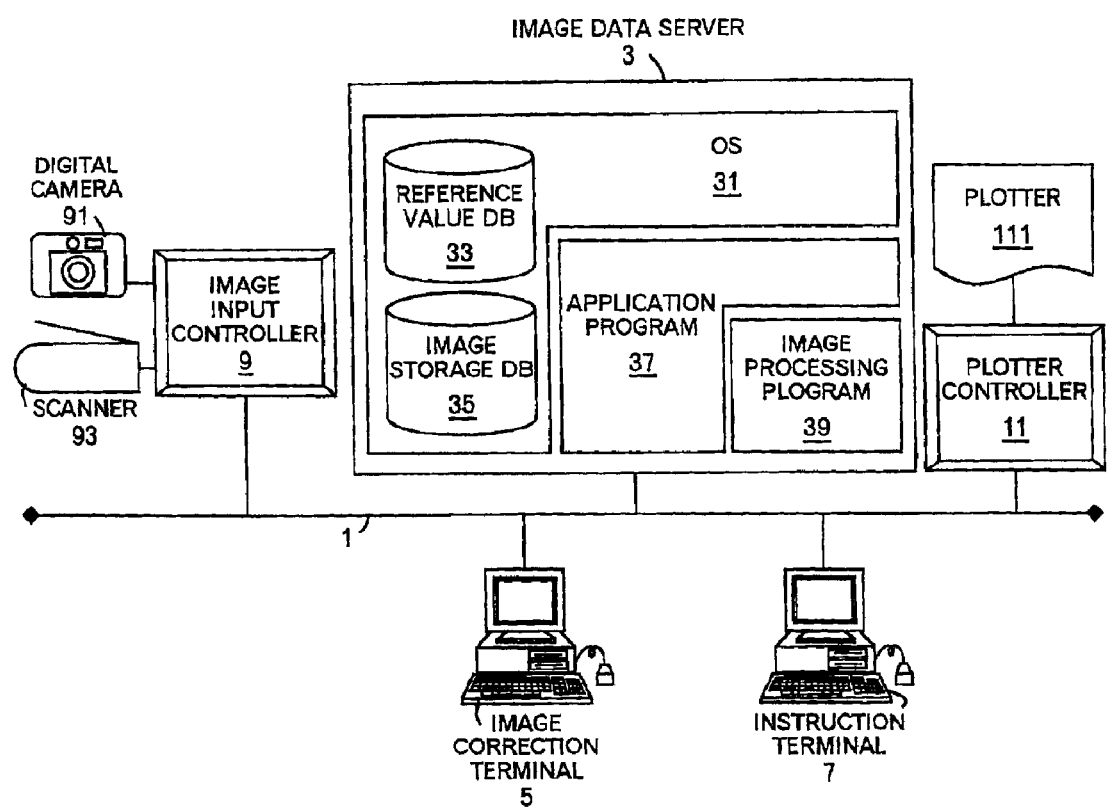
FIG. 1 is a diagram showing an example of a system configuration in an embodiment of the present invention.

FIG. 1 is a system configuration diagram of an embodiment of the present invention. In a system shown in FIG. 1, a network 1 such as a LAN (Local Area Network) is connected with an image input controller 9 for capturing input image data from a digital camera 91 for photographing an image and outputting digital image data or a scanner 93 for digitizing an image photographed by an analog camera (film camera) or the like, an image data server 3 for carrying out a main processing in this embodiment, a plotter controller 11 which is connected to a plotter 111 for printing print data, carries out a processing (for example, a dot processing of a multi-level image) for printing with respect to the processed image data received from the image data server 3, and transmits the print data to the plotter 111, at least one image correction terminal 5 for enabling an operator to manually carry out an image correction on image data before automatic correction and to transmit the manually corrected image data to the image data server 3, and at least one instruction terminal 7 for giving image correction instructions or output instructions to the image data server 3.

The image data server 3 includes an OS (Operating System) 31, an application program 37, and an image processing program 39 for carrying out the main processing of this embodiment. The OS 31 includes a reference value DB 33 for storing statistical information of color saturation and contours, which is calculated from the manually corrected image received from the image correction terminal 5 and the image before the correction, a color saturation reference value, a contour reference value and the like, and an image storage DB 35 for storing image data, such as data of the input image received from the image input controller 9, data of the image processed by the image processing program 39, and data of the manually corrected image generated by the image correction terminal 5. The application program 37 is an interface between the instruction terminal 7 or the image correction terminal 5 and the image data server 3, or a program for carrying out a supplemental processing of the image processing program 39.

In the system shown in FIG. 1, the image data inputted from the digital camera 91 or the scanner 93 through the image input controller 9 is stored in the image storage DB 35 of the image data server 3. The operator uses the image correction terminal 5 to carry out a manual correction on the image (image before the correction) stored in the image storage DB 35, and stores the prepared manually corrected image in the image storage DB 35. The image processing program 39 uses the image before the correction and the manually corrected image to calculate statistical information of color saturation and contours, and a color saturation reference value and a contour reference value, and stores them in the reference value DB 33. Besides, the operator uses the instruction terminal 7 to give instructions to the image data server 3 to carry out a correction processing described below in detail with respect to the input image stored in the image storage DB 35. The image processing program 39 of the image data server 3 reads out the input image from the image storage DB 35, and carries out the correction processing described below in detail. At this time, there is also a case where a processing is carried out using information stored in the reference value DB 33. The image data after the correction, that is, after the processing of the image processing program 39 is ended, is outputted to the plotter controller 11 in the case where the operator gives instructions by the instruction terminal 7. The plotter controller 11 converts the image data after the correction into print data, and the plotter 111 prints the print data.

Figure 2:
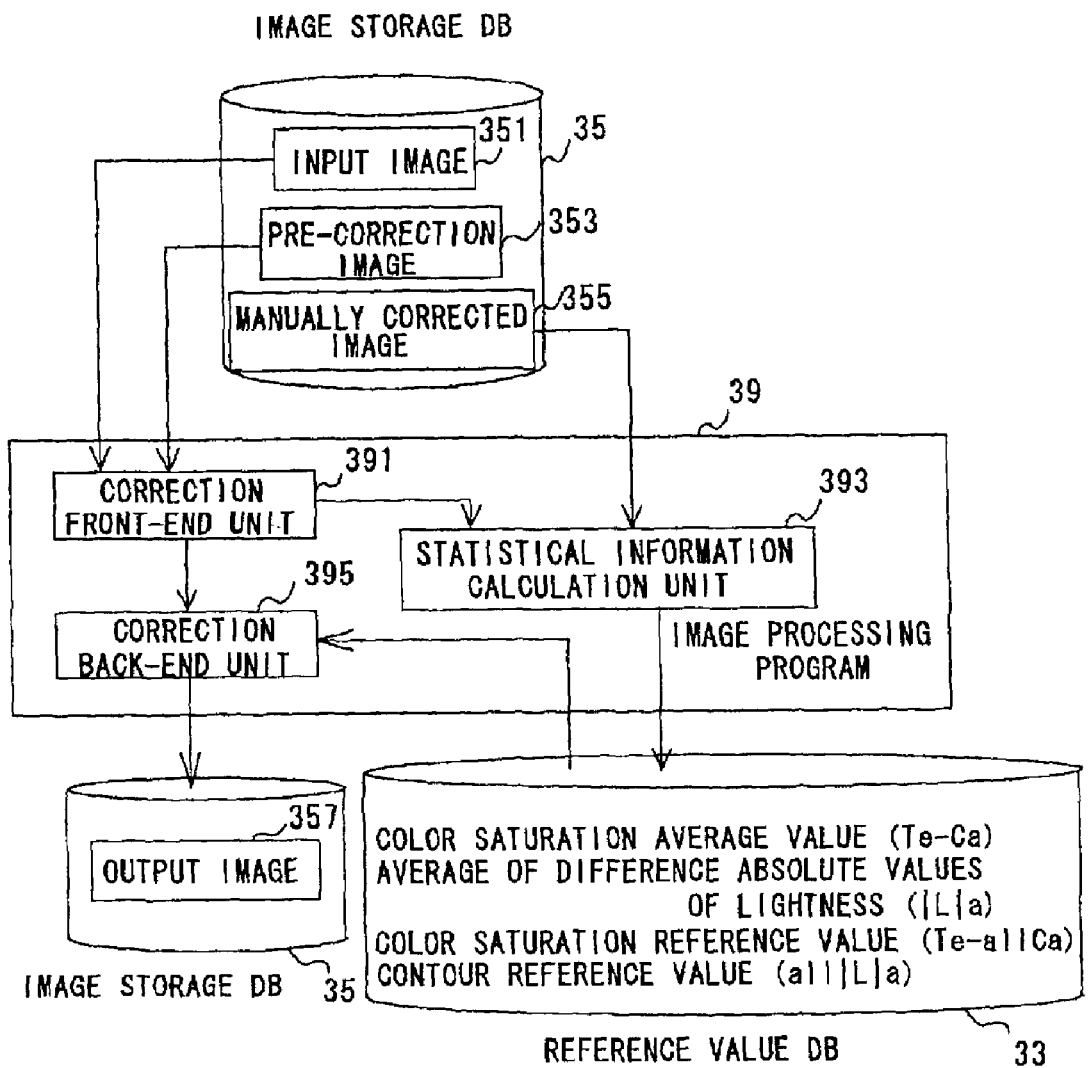
FIG. 2 is a functional block diagram of an image processing program.

FIG. 2 is a functional block diagram of the image processing program 39. The image processing program 39 includes a correction front-end unit 391 for carrying out a processing on an input image 351 and a pre-correction image 353 stored in the image storage DB 35, a statistical information calculation unit 393 for carrying out a processing using a manually corrected image 355 stored in the image storage DB 35 and the pre-correction image 353 having been processed by the correction front-end unit 391 and for storing a color saturation average value (Te—Ca) and an average value ($|L|a$) of difference absolute values of lightness in the reference value DB 33, and a correction back-end unit 395 for carrying out a processing by using a processing result of the correction front-end unit 391 and the reference value stored in the reference DB 33 and for storing an output image 357 as a processing result in the image storage DB 35. Incidentally, the statistical information calculation unit 393 calculates a color saturation reference value (Te—allCa) and a contour reference value (all$|L|a$)

from the color saturation average value and the average value of difference absolute values of lightness as to a plurality of images, and stores them in the reference value DB 33.

Figure 3:
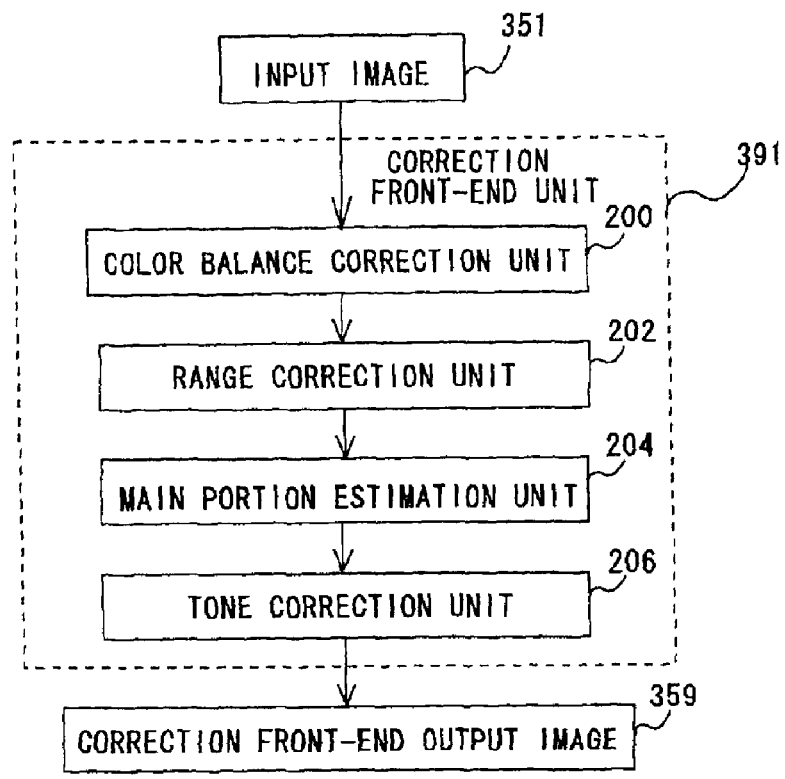
FIG. 3 is a functional block diagram of a correction front-end unit.

FIG. 3 is a functional block diagram of the correction front-end unit 391. The correction front-end unit 391 includes a color balance correction unit 200, a range correction unit 202, a main portion estimation unit 204, and a tone correction unit 206. The input image 351 is inputted to the color balance correction unit 200, and the processing result of the color balance correction unit 200 is stored in the image storage DB 35 or is inputted to the range correction unit 202. The processing result of the range correction unit 202 is stored in the image storage DB 35 or is inputted to the main portion estimation unit 204. The processing result of the main portion estimation unit 204 is stored in the image storage DB 35 or is inputted to the tone correction unit 206. The processing result of the tone correction unit 206 is stored as a correction front-end output image 359 in the image storage DB 35 or is outputted to the correction back-end unit 395.

Figure 4:
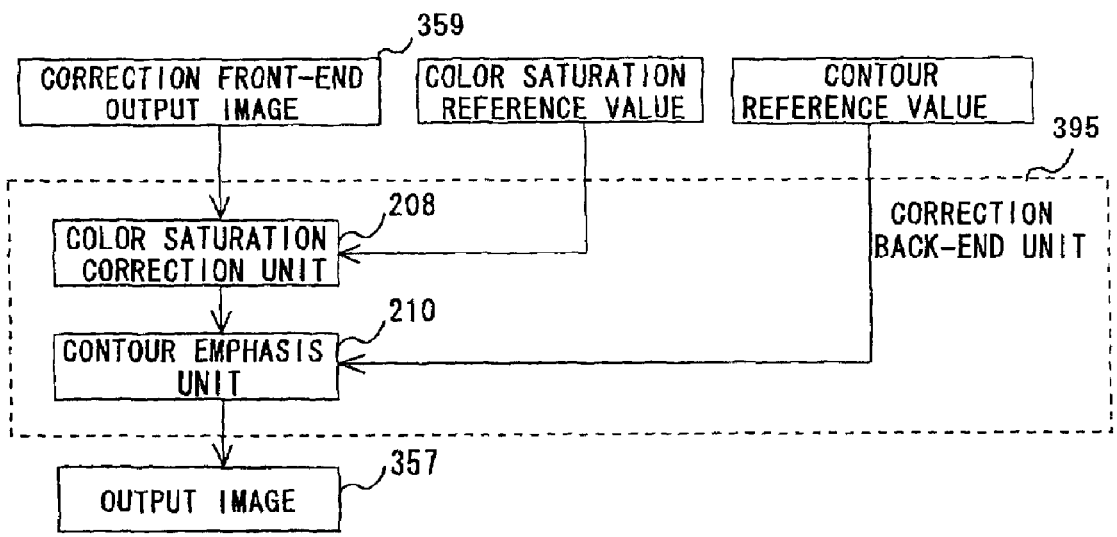
FIG. 4 is a functional block diagram of a correction back-end unit.

FIG. 4 is a functional block diagram of the correction back-end unit 395. The correction back-end unit 395 includes a color saturation correction unit 208, and a contour emphasis unit 210. The color saturation correction unit 208 uses the correction front-end output image 359 and the color saturation reference value stored in the reference value DB 33 to carry out a color saturation correction, and stores the processing result in the image storage DB 35 or outputs it to the contour emphasis unit 210. The contour emphasis unit 210 carries out a contour correction by using the processing result of the color saturation correction unit 208 and the contour reference value stored in the reference value DB 33, and stores the processing result as an output image 357 in the image storage DB 35.

Figure 5:
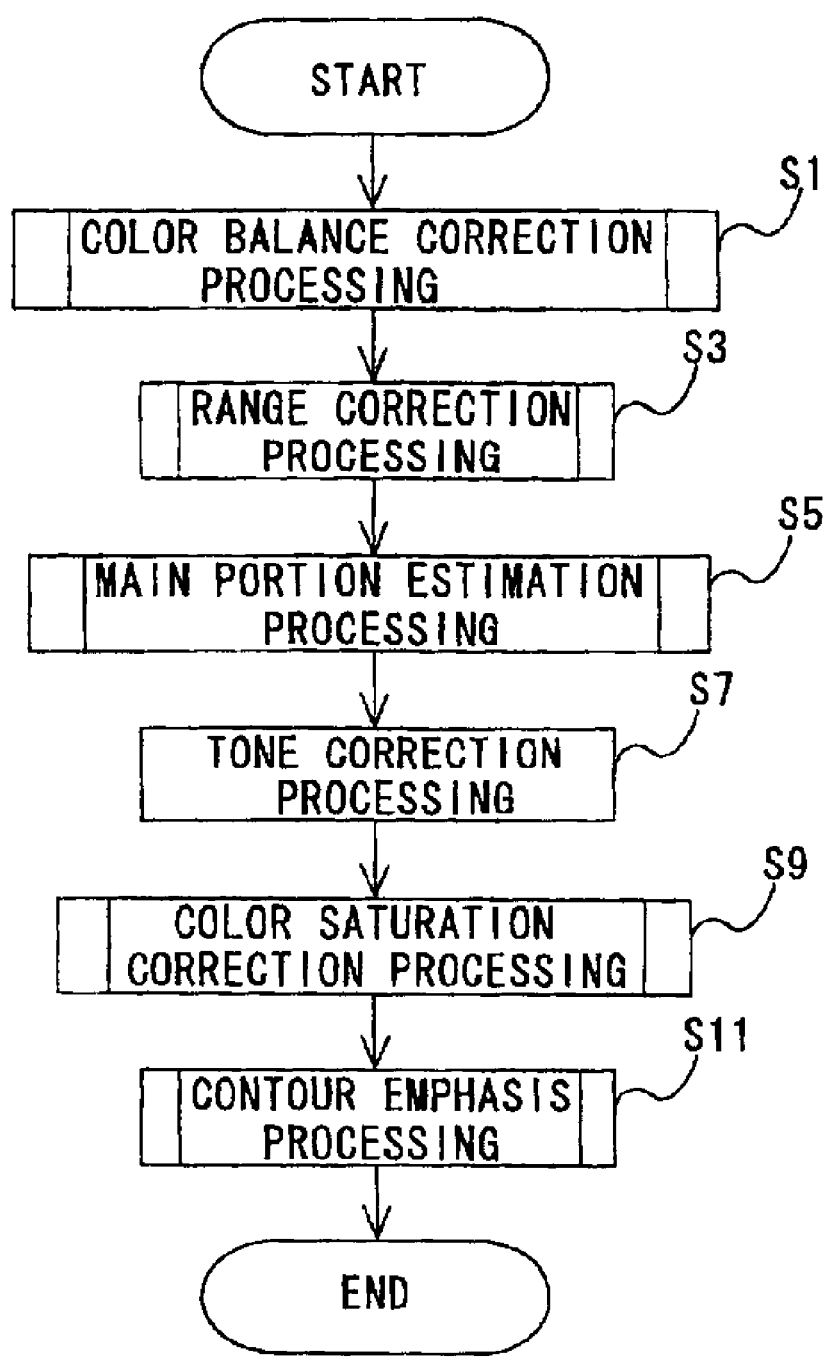
FIG. 5 is a flowchart showing the whole processing flow of an embodiment of the present invention.

FIG. 5 shows a processing flow of the image processing program 39 shown in FIG. 1. First, the color balance correction processing by the color balance correction unit 200 is carried out using the input image 351 stored in the image storage DB 35 (step S1). Next, the range correction processing by the range correction unit 202 is carried out using the result of the color balance correction processing (step S3). Then, the main portion estimation processing by the main portion estimation unit 204 is carried out using the result of the range correction processing (step S5). Besides, the tone correction by the tone correction unit 206 is carried out using the result of the main portion estimation processing (step S7). Further, the color saturation correction processing by the color saturation correction unit 208 is carried out using the result of the tone correction processing and the color saturation reference value stored in the reference value DB 33 (step S9). Finally, the contour emphasis processing by the contour emphasis unit 210 is carried out using the result of the color saturation correction processing and the contour reference value stored in the reference value DB 33 (step S11). The processing result of the contour emphasis processing is stored in the image storage DB 35.

Hereinafter, the respective steps of FIG. 5 will be described in detail.

1. Color Balance Correction

The color balance correction processing, which may be called
as a color fog correction processing, will be described with reference to FIGS. 6 to 14. Incidentally, although a description will be given of a case where a color image having respective color components RGB of level values 0 to 255 is inputted to the color balance correction unit 200, the invention is not limited to this.

Figure 6:
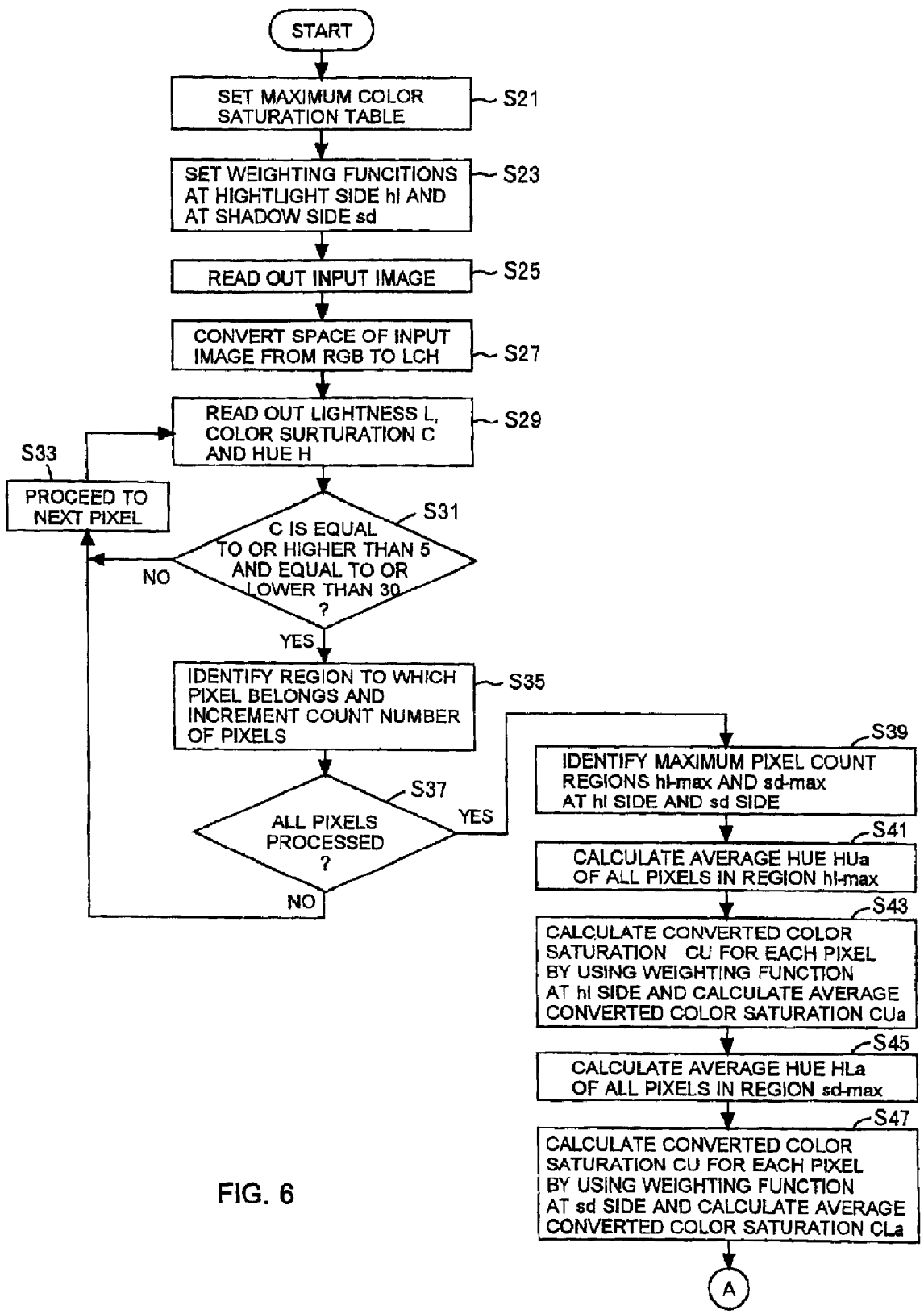
FIG. 6 is a flowchart showing a first processing flow of a color balance correction processing.

FIG. 6 shows a processing flow of the color balance correction processing. First, the color balance correction unit 200 sets a maximum color saturation table (step S21). At this step, first, a color space having components of lightness L, hue H, and color saturation C, which have a range of level values 0 to 255, for example, is divided into six hue regions Hi of RGBCYM (Red (R), Green (G), Blue (B), Cyan (C), Magenta (M), and Yellow (Y)) The number six is an example, and the invention is not limited to this. Besides, with respect to colors existing in each of the hue regions Hi, the colors are categorized into a region hl at a highlight side where the lightness is higher than a lightness value Li of the color having maximum color saturation and a region sd at a shadow side where a lightness value is Li or less. That is, the color space of the LCH is divided into twelve regions T.

Figure 7:
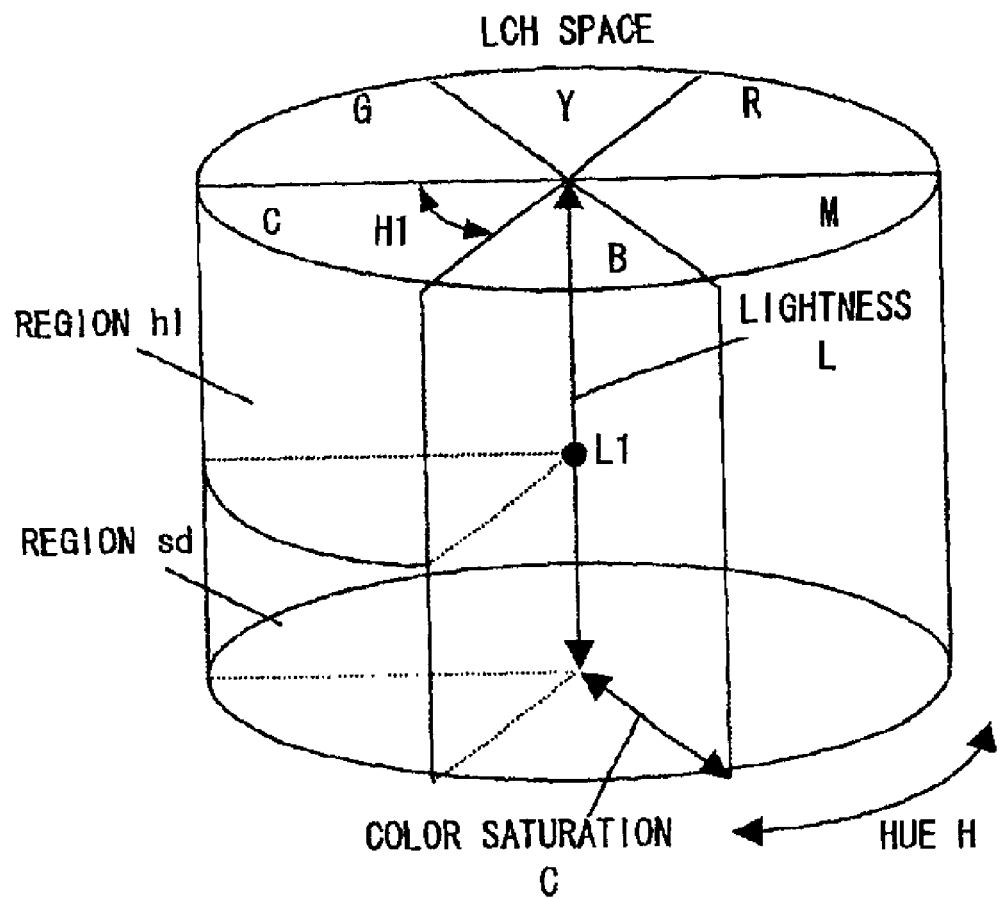
FIG. 7 is a diagram for explanation of region division in an LCH color space.

This state is shown in FIG. 7. As shown in FIG. 7, in the LCH space, the magnitude of the color saturation C is expressed by the length of a line extending in the radius direction from the center of a circle, the hue H is expressed by a rotation angle of the circle, and the magnitude of the lightness L is expressed by the height at a center axis of a cylinder. At the step S1, the hue H is divided into a C system region H1, a B system region H2, an M system region H3, an R system region H4, a Y system region H5, and a G system region H6. Further, each region Hi is divided into the region hl at the highlight side and the region sd at the shadow side. The lightness value Li as the reference of this division is different for every region Hi, and when the division count is determined and the range of each hue is determined, it is theoretically determined. In FIG. 7, the lightness value Li as to the region H1 is shown, and the region H1 is divided into the region hl at the highlight side and the region sd at the shadow side. For convenience of explanation, although the region at the highlight side and the region at the shadow side are shown only as to the region H1, all the regions Hi are divided.

At the step S1, a maximum color saturation table as shown in, for example, FIG. 8 is generated, and data are stored. The maximum color saturation table of FIG. 8 includes a region number column 800, a column 801 of a hl/sd flag for setting 1 on a case of a region at the highlight side and 2 on a case of a region at the shadow side, a hue range column 802 for storing a range of a hue angle of the region, a lightness range column 803 for storing a range of a lightness value of the region, a column 804 for storing a lightness value Li of a color having maximum color saturation in the region, a pixel count column 805 for storing the number of pixels of an input image, belonging to the region, a maximum pixel count flag column 806 for storing 01 in a case where the number of pixels is maximum in the region at the highlight side and 02 in a case where the number of pixels is maximum in the region at the shadow side, a column 807 for storing average color saturation HUa or HLa of the pixels of the input image, and a column 808 for storing average converted color saturation CUa or CLa of the pixels of the input image. At the step S1, data are stored in the region number column 800, the hl/sd flag column 801, the hue region column 802, the lightness region column 803, and the column 804 for storing the lightness value Li of the color having the maximum color saturation.

Again in the explanation of FIG. 6, the color balance correction unit 200 sets weighting function in the region hl at the highlight side and the region sd at the shadow side (step S23). The weighting functions are used at steps S41 and S45 described later. The weighting function in the region hl at the highlight side is as follows:

$$F(L)=Fi(L)=(L-Li)^2/(255-Li)^2 \quad (1)$$

L is a lightness value of each pixel. Li is a lightness value of a color having maximum color saturation in a region Hi.

The weighting function in the region sd at the shadow side is as follows:

$$G(L)=Gi(L)=L^2/Li^2 \quad (2)$$

L is a lightness value of each pixel. Li is a lightness value of a color having maximum color saturation in a region Hi.

Figure 9:
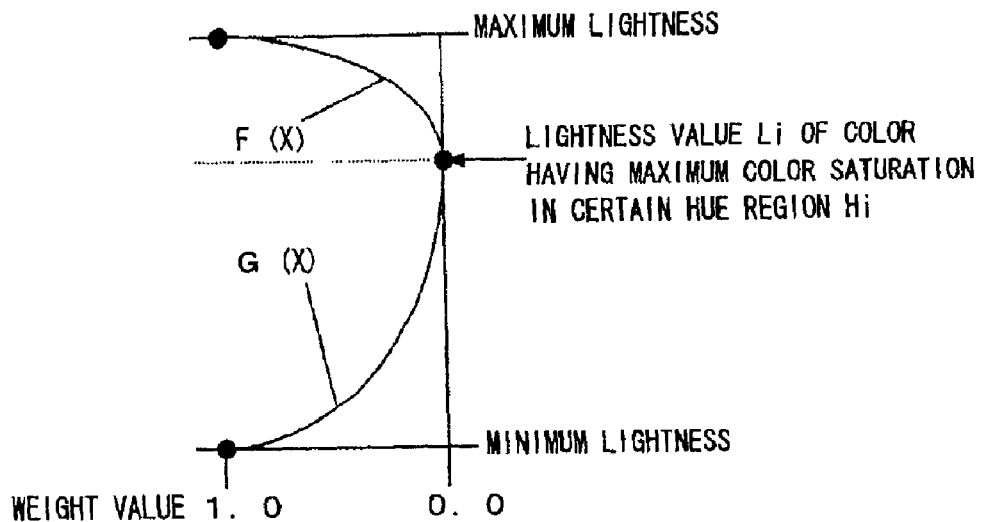
FIG. 9 is a diagram expressing weighting functions F(L) and G(L)
Figure 10:
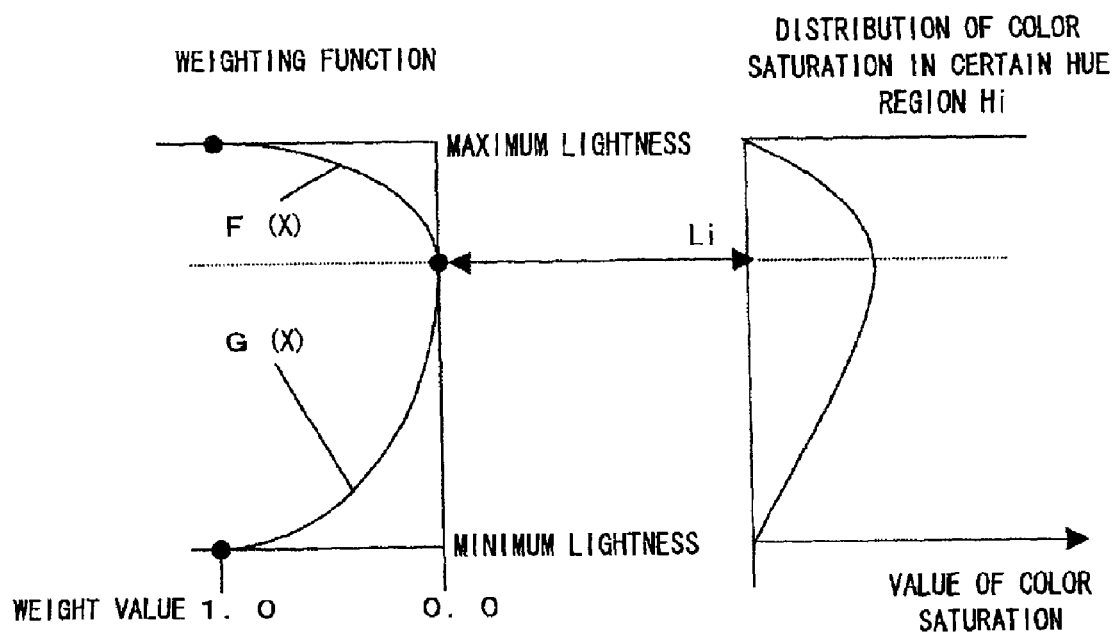
FIG. 10 is a diagram for explaining the reason why the weighting functions shown in FIG. 9 are adopted.
Figure 13:
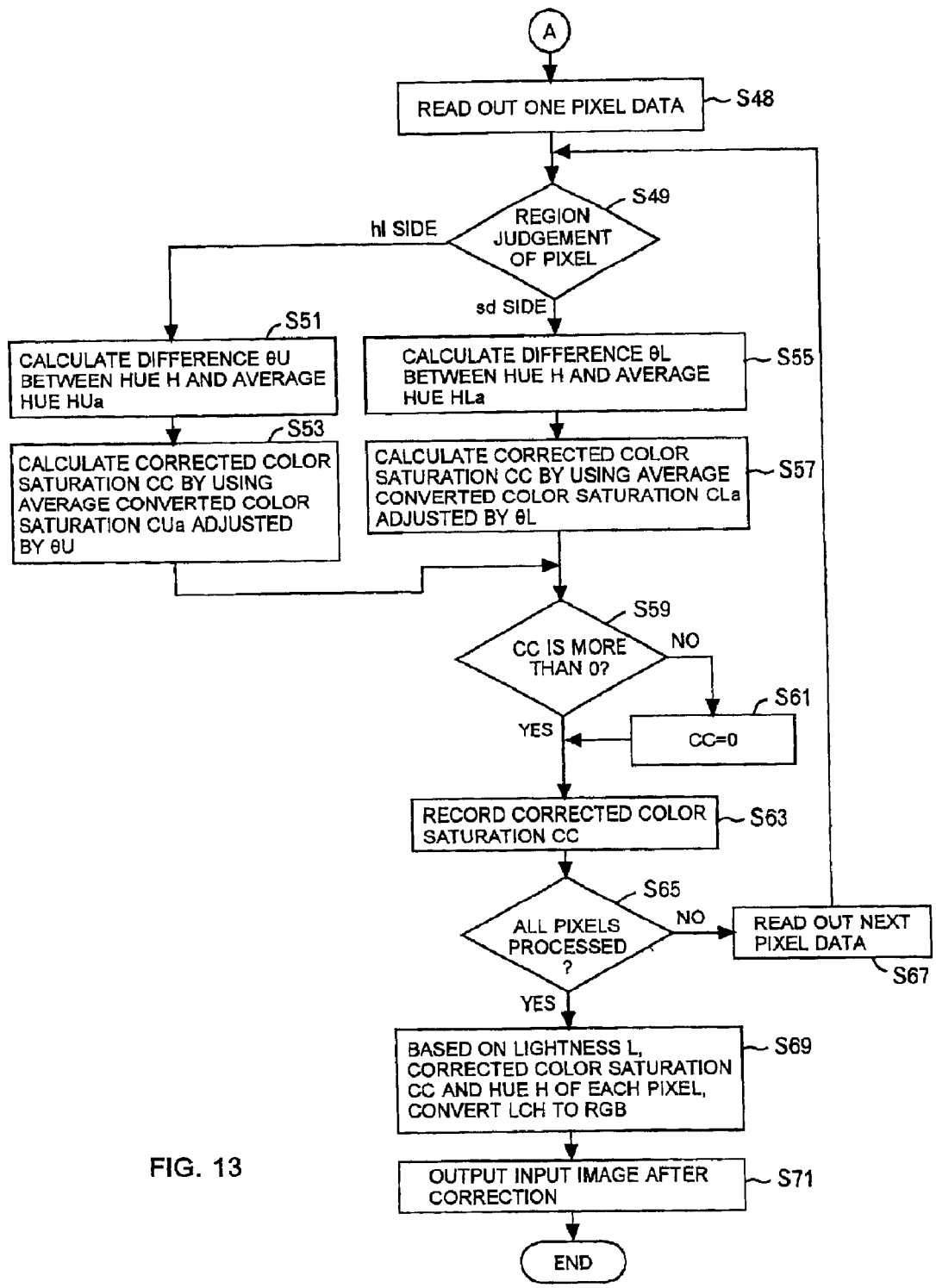
FIG. 13 is a flowchart showing a second processing flow of a color balance correction processing.

FIG. 9 is a graph as to the weighting functions F(L) and G(L). In FIG. 9, the vertical axis indicates the lightness L, and the horizontal axis indicates the weight value (0.0 to 1.0). The weight value becomes 0 in the case where the lightness L is the lightness value Li of the color having the maximum color saturation in a certain hue region Hi, and becomes 1 at the maximum lightness and the minimum lightness. Although it is not always necessary that the functions are quadratic functions as indicated in the expression (1) and the expression (2), it is necessary that they satisfy the above conditions. The reason why such weighting functions are used is that as shown at the right side of FIG. 10, a value of color saturation in a certain hue region Hi becomes maximum at the lightness value Li of the color having the maximum color saturation in the hue region Hi, and the value of color saturation becomes low when the lightness approaches the maximum lightness or the minimum lightness. That is, since there is a high possibility that a pixel having a lightness value in the vicinity of the lightness value Li is an originally colored pixel, the possibility of color fog is low, and the pixel is unsuitable for estimation of a correction amount of color fog. Accordingly, as shown at the left side of FIG. 10, a weight value of a pixel having a lightness value in the vicinity of the lightness value Li is made low. A pixel having a lightness value in the vicinity of the maximum lightness or the minimum lightness is a pixel having a high possibility of color fog, and a weight value is made high and the pixel is actively used for calculation of the correction amount of color fog.

Incidentally, the step S21 and the step S23 may be carried out in advance if the number of regions is determined, or may be carried out for each processing of an input image.

Again in the processing flow of FIG. 6, the color balance correction unit 200 reads out an input image to be processed from the image storage portion 35 (step S25), converts the color space of the input image from the RGB space to the LCH space having dimensions of lightness L, hue H and color saturation C, and acquires the lightness L, color saturation C and hue H of each pixel (step S27). The acquired lightness L, color saturation c and hue H of each pixel are stored in a pixel table. FIG. 11 shows an example of the pixel table. In the case of the pixel table shown in FIG. 11, there are provided a column 1100 of a pixel identifier, a column 1101 of lightness L, a column 1102 of color saturation C, a column 1103 of hue H, a column 1104 of a region for storing the number of a region to which the pixel belongs, a column 1105 of a hl/sd flag for expressing a region hl (expressed by "1") at the highlight side or a region sd (expressed by "2") at the shadow side, a column 1106 of converted color saturation CU or CL, a column 1107 of hue HU or HL, and a column 1108 of corrected color saturation. At step S27, data are stored in the column 1100 of the pixel identifier, the column 1101 of the lightness L, the column 1102 of the color saturation C, and the column 1103 of the hue H.

Next, the color balance correction unit 200 reads out the lightness L, the color saturation C and the hue H of one pixel from the pixel table (step S29), and judges whether the color saturation C is not less than 5 and not higher than 30 (step S31). This is for removing pixels having an excessively low or high color saturation here from consideration. In the case of a pixel in which the color saturation C is less than 5 or higher than 30, the processing proceeds to a next pixel (step S33) and is returned to the step S29. On the other hand, in the case where the color saturation C is not less than 5 and not higher than 30, a region to which the pixel belongs is identified and the count number of pixels as to the region is incremented (step S35). That is, by using the hue H and the lightness L of the pixel, from the hue range and the lightness range (the hue range column 802 and the lightness range column 803) of each region prescribed in the maximum color saturation table, it is detected that the pixel belongs to which region, and the number of the region is registered in the region column 1104 of the pixel table. At the registration to the pixel table, that the pixel belongs to which of the region at the highlight side and the region at the shadow side is also registered in the hl/sd flag column 1105 of the pixel table. Further, the count number of pixels of the region to which the pixel belongs is incremented by one. The value of the count is stored in the pixel count column 805 of the maximum color saturation table.

Then, it is judged whether the processing is carried out for all pixels (step S37). In case there is an unprocessed pixel, the processing proceeds to the step S33 and the processing for a next pixel is performed.

On the other hand, in the case where the processing is completed for all the pixels, the color balance correction unit 200 identifies the most pixel count region hl-max in the regions hl at the highlight side and sd-max in the regions sd at the shadow side (step S39). This is performed by comparing the numerical values stored in the pixel count column 805 of the maximum color saturation table with each other for each value (1 or 2) stored in the hl/sd flag column 801. In the case where the maximum pixel count region hl-max in the regions at the highlight side is identified, 01 is stored at the line of the region of the maximum pixel count flag column 806 in the maximum color saturation table, and in the case where the maximum pixel count region sd-max in the regions at the shadow side is identified, 02 is stored at the line of the region of the maximum pixel count flag column 806 in the maximum color saturation table. In the example of FIG. 8, the region of the number 1 is the maximum pixel count region hl-max at the highlight side, and the region of the number 6 is the maximum pixel count region sd-max at the shadow side. The maximum pixel count regions hl-max and sd-max become reference regions when a correction amount of color saturation due to the color fog is calculated.

As shown in FIG. 12, a color saturation distribution of a hue region of a Y system (left side in FIG. 12) is different from a color saturation distribution of a hue region of a G system (right side in FIG. 12), and especially lightness values $L_y$ and $L_G$ of colors having maximum color saturation are quite different from each other. When the correction amount of the color fog is calculated from the whole hue, also as shown in FIG. 12, since the lightness value Li having the maximum color saturation is different for every hue region, many pixels having a high possibility that they are colored pixels with originally little color fog are used, and the accuracy of the correction amount of the color fog is lowered. Accordingly, in this embodiment, by using only the pixels belonging to the maximum pixel count region, the correction amount of the color saturation is calculated.

Next, the color balance correction unit 200 calculates average hue HUa as to all the pixels belonging to the maximum pixel count region hl-max at the highlight side (step S41). The maximum pixel count region hl-max is detected by reading out the line at which 01 is stored in the maximum pixel count flag column 806 of the maximum color saturation table. Then, the region column 1104 of the pixel table is scanned to detect the pixels belonging to the maximum pixel count region hl-max, and the value of the hue H stored in the column 1103 of the hue H is stored in the column 1107 of the hue HU/HL. Then, values stored in the column 1107 of the hue HU/HL are added as to all the pixels belonging to the maximum pixel count region hl-max, and the result is divided by the number of pixels. The calculated average hue HUa is stored in the column 807 of the average hue HUa/HLa at the line (line at which 01 is stored in the maximum pixel count flag column 806) of the maximum pixel count region hl-max in the maximum color saturation table.

Then, the color balance correction unit 200 uses the weighting function F(L) expressed by the expression (1) set at the step S23 to calculate converted color saturation CU as to each pixel belonging to the maximum pixel count region hl-max at the highlight side. Then, average converted color saturation CUa of the converted color saturation CU is calculated (step S43). The converted color saturation CU is calculated through the following expression.

$$CU = C \times F(L) \quad (3)$$

The color balance correction unit 200 reads out the line at which 01 is stored in the maximum pixel count flag column 806 of the maximum color saturation table to detect the maximum pixel count region hl-max. Then, the region number column 1104 of the pixel table is scanned to detect pixels belonging to the maximum pixel count region hl-max, the value of the color saturation C stored in the column 1102 of the color saturation C is converted by using the lightness L in accordance with the expression (3) to acquire the converted color saturation CU, and the value of the converted color saturation CU is stored in the column 1106 of the converted color saturation CU/CL. Then, the value stored in the column 1106 of the converted color saturation CU/CL is added as to all pixels belonging to the maximum pixel count region hl-max, and the result is divided by the number of pixels. The calculated average converted color saturation CUa is stored in the column 808 of the average converted color saturation CUa/CLa at the line (line at which 01 is stored in the maximum pixel count flag column 806) of the maximum pixel count region hl-max in the maximum color saturation table.

For example, from the above expression (3), with respect to the color fog at the highlight side, as shown in FIG. 8, HUa=30° and CUa=10 are obtained from the calculation. This means that the color fog at the highlight side occurs at the hue 30° in the LCH color space, that is, the color fog occurs toward the tint of orange from red, and its intensity has the color saturation value 10.

Besides, the color balance correction unit 200 calculates average hue HLa as to all pixels belonging to the maximum pixel count region sd-max at the shadow side (step S45). The maximum pixel count region sd-max is detected by reading out the line at which 02 is stored in the maximum pixel count flag column 806 of the maximum color saturation table. Then, the region number column 1104 of the pixel table is scanned to detect pixels belonging to the maximum pixel count region sd-max, and the value of the hue H stored in the column 1103 of the hue H is stored in the column 1107 of the hue HU/HL. The value stored in the column 1107 of the hue HU/HL is added as to all pixels belonging to the maximum pixel count region sd-max, and the result is divided by the number of pixels. The calculated average hue HLa is stored in the column 807 of the average hue HUa/HLa at the line (line at which 02 is stored in the maximum pixel count flag column 806) of the maximum pixel count region sd-max in the maximum color saturation table.

The color balance correction unit 200 uses the weighting function G(L) expressed by the expression (2) set at the step S23 to calculate the converted color saturation CL as to each pixel belonging to the maximum pixel count region sd-max at the shadow side. Then, average converted color saturation CLa of the converted color saturation CL is calculated (step S47). The converted color saturation CL is calculated by the following expression.

$$CL = C \times G(L) \quad (4)$$

The color balance correction unit 200 reads out the line at which 02 is stored in the maximum pixel count flag column 806 of the maximum color saturation table to detect the maximum pixel count region sd-max. The region number column 1104 of the pixel table is scanned to detect pixels belonging to the maximum pixel count region sd-max, the value of the color saturation C stored in the column 1102 of the color saturation C is converted by using the lightness L and in accordance with the expression (4) to acquire the converted color saturation CL, and the value of the converted color saturation CL is stored in the column 1106 of the converted color saturation CU/CL. Then, the value stored in the column 1106 of the converted color saturation CU/CL is added as to all the pixels belonging to the maximum pixel count region sd-max, and the result is divided by the number of pixels. Then, the calculated average converted color saturation CLa is stored in the column 808 of the average converted color saturation CUa/CLa at the line (line at which 02 is stored in the maximum pixel count flag column 806) of the maximum pixel count region sd-max in the maximum color saturation table.

With respect to the steps S41 to S47, the order can be replaced, and they can also be carried out in parallel. The processing proceeds to FIG. 13 through a terminal A.

Next, corrected color saturation CC is calculated as to all the pixels of the input image to remove the color fog. The color balance correction unit 200 reads out data of one pixel (step S48), and carries out a region judgment of the pixel (step S49). On the basis of the data stored in the hl/sd flag column 1105 of the pixel table, the processing proceeds to step S51 if the pixel belongs to the region at the highlight side and proceeds to step S55 if the pixel belongs to the region at the shadow side. In the case where the color saturation C is less than 5 or higher than 30, data is not stored in the hl/sd flag column 1105. Thus, in that case, on the basis of the lightness range and the hue range stored in the hue range column 802 and the lightness range column 803 of the maximum color saturation table, it is judged to which region the value of the lightness L and the value of the hue H stored in the column 1101 of the lightness L and the column 1103 of the hue H belong, and the processing proceeds to step S51 or step S55.

In case it is judged that the pixel belongs to the region at the highlight side, the color balance correction unit 200 calculates an angle difference θU (0°≦θ≦360°) between the hue H of the pixel and the average hue HUa, and stores it into the storage device (step S51). That is, the following calculation is carried out.

$$\theta U = H - HUa \quad (5)$$

The value of the hue H is read out from the column 1103 of the hue H in the pixel table, the average hue HUa stored in the column 807 of the average hue HUa/HLa at the line (line at which 01 is stored in the maximum pixel count flag column 806) of the maximum pixel count region hl-max is read out, and a calculation is made in accordance with the expression (5).

The average converted color saturation CUa adjusted by using θU is further used to calculate the corrected color saturation CC after the color balance correction, and is stored into the storage device (step S53). That is, the following calculation is carried out.

$$CC = C - CUa \times \cos(\theta U) \quad (6)$$

The value of the color saturation C is read out from the column 1102 of the pixel table, the average converted color saturation CUa stored in the column 808 of the average converted color saturation CUa/CLa at the line (line at which 01 is stored in the maximum pixel count flag column 806) of the maximum pixel count region hl-max is read out, and a calculation is made in accordance with the expression (6).

To calculate the cosine of the angle difference θU between the hue H and the average hue HUa means that the color balance correction is not carried out in the vertical direction of the color fog hue angle.

For example, in the case where the input pixel is (L, C, H)=(200, 16, 30°), the color fog amount is HUa=30°, and CUa=10, the input pixel becomes a color fog pixel, and the color saturation after the color balance correction becomes CC=5. The color fog can be removed by decreasing the color saturation of the input pixel from 15 to 5 in this way. After the step S53, the processing proceeds to step S59.

On the other hand, in the case where it is judged that the pixel belongs to the region at the shadow side, the color balance correction unit 200 calculates an angle difference θL (0°≦θ≦360°) between the hue H of the pixel and the average hue HLa, and stores it into the storage device (step S55). That is, the following calculation is carried out.

$$\theta L = H - HLa \quad (7)$$

The value of the hue H is read out from the column 1103 of the color saturation H in the pixel table, the average hue HLa stored in the column 807 of the average hue HUa/HLa at the line (line at which 02 is stored in the maximum pixel count flag column 806) of the maximum pixel count region sd-max is read out, and a calculation is made in accordance with the expression (7).

Then, the corrected color saturation CC after the color balance correction is calculated by further using the average converted color saturation CLa adjusted by using θL, and is stored into the storage device (step S57). That is, the following calculation is carried out.

$$CC = C - CLa \times \cos(\theta L) \quad (8)$$

The value of the color saturation c is read out from the column 1102 of the color saturation C in the pixel table, the average converted color saturation CLa stored in the column 808 of the average conversion color saturation CUa/CLa at the line (line at which 02 is stored in the maximum pixel count flag column 806) of the maximum pixel count region sd-max is read out, and a calculation is made in accordance with the expression (8). After the step S57, the processing proceeds to step S59.

Then, it is judged whether or not the corrected color saturation CC calculated at the step S53 or the step S57 is not less than 0 (step S59). In case it is less than 0, the corrected color saturation CC is made 0 (step S61).

In the case where the corrected color saturation CC is not less than 0, or after the step S61, the corrected color saturation CC is recorded in the column 1108 of the corrected color saturation CC in the pixel table (step S63). Then, the color balance correction unit 200 judges whether or not all the pixels are processed (step S65). If all the pixels are not processed, data of a next pixel is read out (step S67), and the processing is returned to the step S49.

On the other hand, in the case where it is judged that all the pixels are processed, the LCH space is converted into the RGB space on the basis of the lightness L, the corrected color saturation CC and the hue H of each pixel stored in the pixel table (step S69) The input image after the correction is outputted to the image storage DB 35 and is stored (step S71). Incidentally, here, the image is not outputted to the image storage DB 35, but may be outputted to the range correction unit 202.

FIG. 14 shows a change in the color saturation before the color balance correction and after the color balance correction. In an example of FIG. 14, a color saturation distribution before the correction is expressed by a circle of a dotted line. On the other hand, a color saturation distribution after the color balance correction is indicated by a solid line. The color balance correction is not carried out in the vertical direction (dotted line) of the color fog direction determined by the average hue HUa or HLa. The magnitude of the color saturation is changed in accordance with the expression (6) or the expression (8).

Like this, the estimation of the correction amount of the color fog is carried out by using the function with the weight of the lightness L and by the statistical amount of the maximum pixel count region, so that the estimation can be carried out by effectively using the pixels having a high possibility of the color fog, and accordingly, the accuracy of the estimation becomes excellent. Besides, since the distribution of the color saturation value is largely different between, for example, the hue region of the Y system and the hue region of the G system shown in FIG. 12, when the estimation is made from the whole color space, there occurs a case where the accuracy is extremely lowered. However, in this embodiment, this can be avoided. Further, when the pixel of the input image is corrected, the correction amount is used by adjusting it of the shift (θU or θL) between the reference hue (average hue HUa or HLa) of the correction and the hue value of the pixel. In the conventional system in which an estimated correction amount is uniformly used for the whole hue of an image, there can occur a state in which a correction processing is carried out for a pixel which is a pixel on the image and belongs to a hue region which is not originally subjected to the color fog, a value of a color saturation component is changed toward an unexpected direction, so that the color of the image is partially faded or blurred. However, in this embodiment, this is avoided, and excellent image quality can be obtained.

2. Range Correction

With respect to the image corrected by the color balance correction processing, the range correction unit 202 carries out a processing described with reference to FIGS. 15 to 22.

Figure 15:
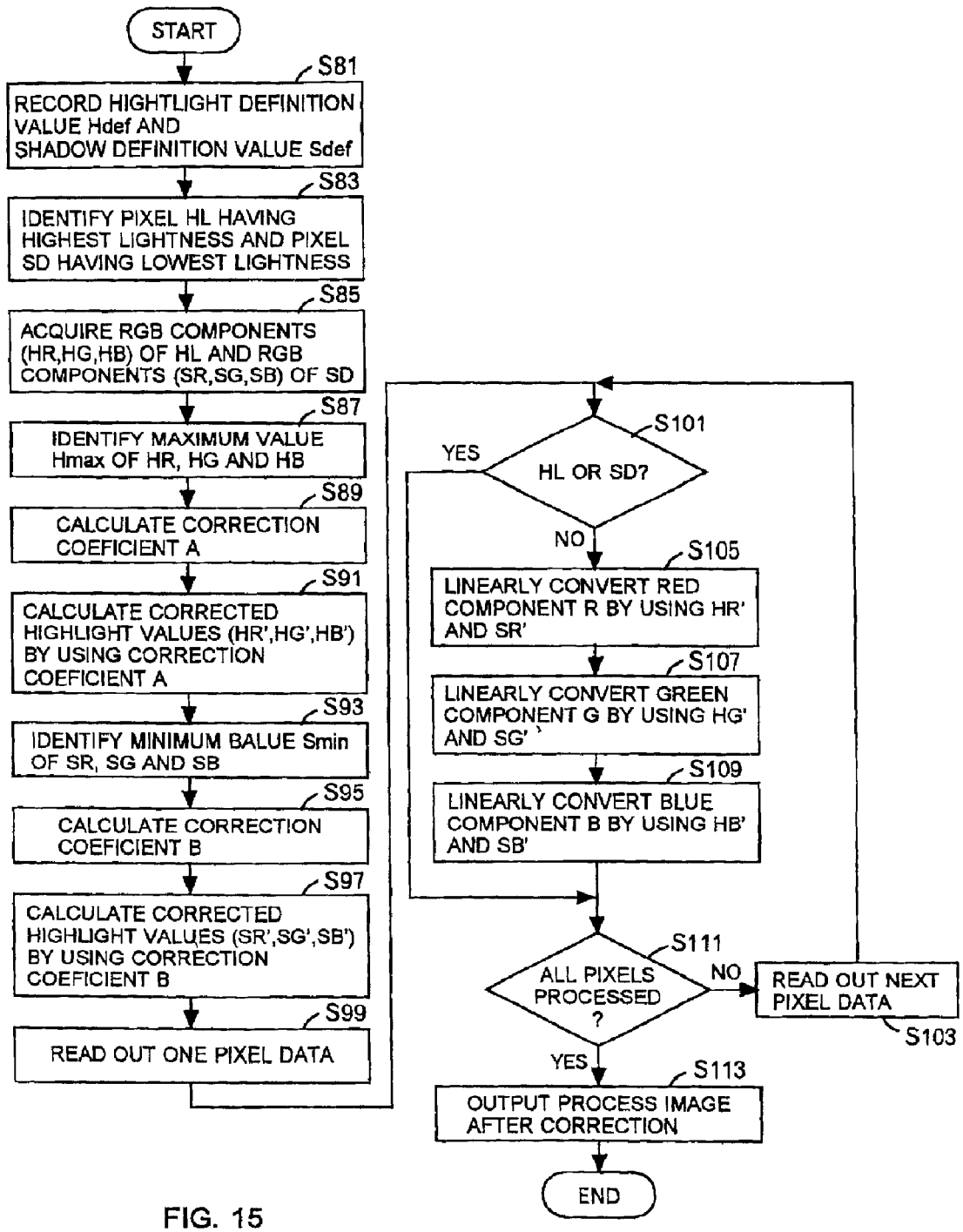
FIG. 15 is a flowchart showing a processing flow of a range correction processing.

FIG. 15 shows a processing flow of the range correction. First, the range correction unit 202 records a highlight definition value Hdef and a shadow definition value Sdef inputted by the operator in advance (step S81). The highlight definition value Hdef and the shadow definition value Sdef are set in a range correction table. FIG. 16 shows an example of the range correction table. The range correction table is a table for storing data of a highlight pixel HL having the highest lightness among pixels of a process image and a shadow pixel SD having the lowest lightness.

The range correction table is provided with a type column 1600 for indicating the highlight pixel HL or the shadow pixel SD, a pixel identifier column 1601 for storing a pixel identifier of the highlight pixel HL or the shadow pixel SD, a red column 1602 for storing a red level value HR or SR of the highlight pixel HL or the shadow pixel SD, a green column 1603 for storing a green level value HG or SG of the highlight pixel HL or the shadow pixel SD, a blue column 1604 for storing a blue level value HB or SB of the highlight pixel HL or the shadow pixel SD, a definition value column 1605 for storing the highlight definition value Hdef or the shadow definition value Sdef inputted by the operator, a coefficient column 1606 for storing a correction coefficient A or B of the highlight pixel or the shadow pixel, a corrected red column 1607 for storing a red level value HR' or SR' of the highlight pixel or the shadow pixel after the correction, a corrected green column 1608 for storing a green level value HG' or SG' of the highlight pixel or the shadow pixel after the correction, and a corrected blue column 1609 for storing a blue level value HB' or SB' of the highlight pixel or the shadow pixel after the correction.

The range correction unit 202 stores the highlight definition value Hdef at the line of the highlight pixel HL of the definition value column 1605 of the range correction table, and stores the shadow definition value Sdef at the line f the shadow pixel SD of the definition value column 1605.

Next, the range correction unit 202 reads out data of the process image, calculates lightness values of the respective pixels, and detects the highlight pixel HL having the highest lightness and the shadow pixel SD having the lowest lightness (step S83). RGB level values of the respective pixels are obtained from the pixel table, and lightness values corresponding to those are calculated. The lightness values of the respective pixels are compared with each other, and the pixel identifier of the pixel having the highest lightness and the pixel identifier of the pixel having the lowest lightness are identified. Then, the pixel identifier of the pixel having the highest lightness is stored at the line of the highlight pixel HL of the pixel identifier column 1601 of the range correction table, and the pixel identifier of the pixel having the lowest lightness is stored at the line of the shadow pixel SD of the pixel identifier column 1601.

FIG. 17 shows an example of the pixel table. In the example of FIG. 17, there are provided a pixel identifier column 1700 for storing a pixel identifier, a red column 1701 for storing a red (R) level value, a green column 1702 for storing a green (G) level value, a blue column 1703 for storing a blue (B) level value, a corrected red column 1704 for storing a red (R') level value after the range correction, a corrected green column 1705 for storing a green (G') level value after the range correction, and a corrected blue column 1706 for storing a blue (B') level value after the range correction.

Besides, the range correction unit 202 acquires RGB components (HR, HG, HB) of the highlight pixel HL and RGB components (SR, SG, SB) of the shadow pixel SD (step S85). The data (level values of red, green and blue) at the line of the pixel identifier of the highlight pixel HL are read out from the pixel table, and are respectively stored in the red column 1602, the green column 1603, and the blue column 1604 at the line of the highlight pixel HL in the range correction table. Besides, the data (level values of red, green and blue) at the line of the pixel identifier of the shadow pixel SD are read out from the pixel table, and are respectively stored in the red column 1602, the green column 1603, and the blue column 1604 at the line of the shadow pixel SD in the range correction table.

Incidentally, a maximum gradation value, which the pixels of the process image can take in the RGB space, is made Tmax, and a minimum gradation value is made Tmin. As described in the color balance correction, since the range width of the RGB is 0 to 255, Tmax becomes 255 and Tmin becomes 0.

Next, the range correction unit 202 identifies a maximum value Hmax of the RGB components (HR, HG, HB) of the highlight pixel HL (step S87). By comparing numerical values stored in the red column 1602, the green column 1603, and the blue column 1604 at the line of the highlight pixel HL in the range correction table, the maximum value Hmax is identified.

Next, the range correction unit 202 calculates the correction coefficient A (step S89). The correction coefficient A is calculated through the following expression.

$$A = (H\text{def} - T\text{min})/(H\text{max} - T\text{min}) \tag{9}$$

In case Tmin is 0, the term of Tmin can be neglected. The calculated correction coefficient A is stored in the column 1606 of the coefficient A/B at in the line of the highlight pixel HL in the range correction table.

Next, the range correction unit 202 uses the calculated correction coefficient A to calculate corrected highlight pixel values HR', HG' and HB' (step S91). This calculation is made in accordance with the following expression.

$$HR' = T\text{min} + A \times (HR - T\text{min}) \tag{10}$$

$$HG' = T\text{min} + A \times (HG - T\text{min}) \tag{11}$$

$$HB' = T\text{min} + A \times (HB - T\text{min}) \tag{12}$$

If Tmin=0, the term of Tmin can be neglected. The calculation results are respectively stored in the corrected red HR'/SR' column 1607, the corrected green HG'/SG' column 1608, and the corrected blue HB'/SB' column 1609 at the line of the highlight pixel HL of in the range correction table. Besides, by using the pixel identifier of the highlight pixel HL, the corrected highlight pixel values HR', HG' and HB' are respectively stored in the corrected red (R') column 1704, the corrected green (G') column 1705, and the corrected blue (B') column 1706 of the pixel table.

Next, the range correction unit 202 identifies a minimum value Smin of the RGB components (SR, SG, SB) of the shadow pixel SD (step S93). At the line of the shadow pixel SD of the range correction table, numerical values stored in the red column 1602, the green column 1603, and the blue column 1604 are compared with one another so that the minimum value Smin is identified.

Then, the range correction unit 202 calculates the correction coefficient B (step S95). The correction coefficient B is calculated through the following expression.

$$B = (T\text{max} - S\text{def})/(T\text{max} - S\text{min}) \tag{13}$$

The calculated correction coefficient B is stored in the coefficient A/B column 1606 at the line of the shadow pixel SD in the range correction table.

Next, the range correction unit 202 uses the calculated correction coefficient B to calculate corrected shadow pixel values SR', SG' and SB' (step S97). This calculation is made in accordance with the following expression.

$$SR' = T\text{max} - B \times (T\text{max} - SR) \tag{14}$$

$$SG' = T\text{max} - B \times (T\text{max} - SG) \tag{15}$$

$$SB' = T\text{max} - B \times (T\text{max} - SB) \tag{16}$$

The calculation results are respectively stored in the corrected red HR'/SR' column 1607, the corrected green HG'/SG' column 1608, and the corrected blue HB'/SB' column 1609 at the line of the shadow pixel in the range correction table. Besides, the corrected shadow pixel values SR', SG' and SB' are respectively stored in the corrected red (R') column 1704, the corrected green (G') column 1705, and the corrected blue (B') column 1706 at the lines of the pixel identifier of the shadow pixel in the pixel table by using the pixel identifier of the shadow pixel. Incidentally, the order of the step S87 to step S91 and the step S93 to the step S97 can be replaced.

Figure 18A:
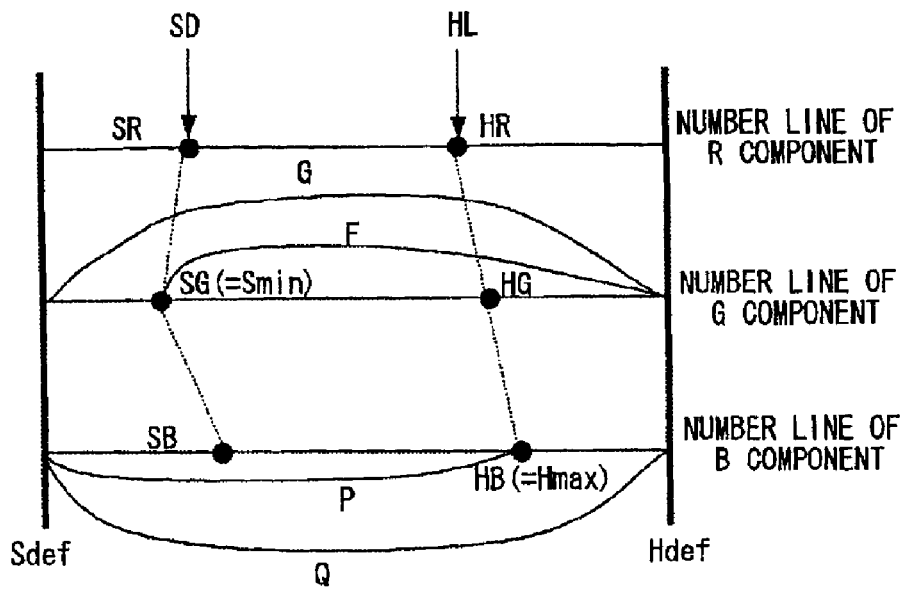
FIGS. 18A and 18B are schematic diagrams for explaining the outline of the range correction.
Figure 18B:
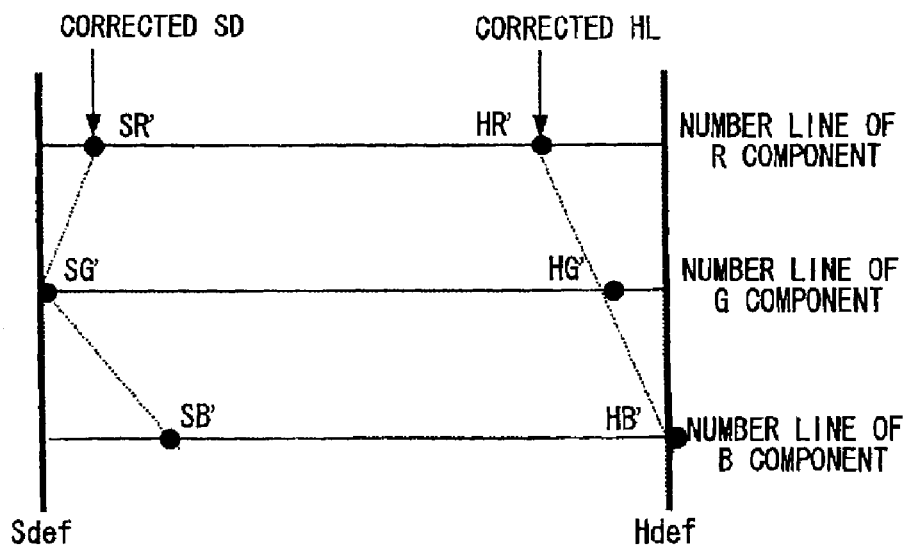

FIGS. 18A and 18B show the outline of the processing carried out at the step S87 to the step S97. FIG. 18A shows the respective components of the highlight pixel and the shadow pixel before the correction with the correction coefficient. In the example of FIGS. 18A and 18B, Tmax=Hdef, and Tmin=Sdef. The level value SR of the R component of the shadow pixel and the level value HR of the R component of the highlight pixel are shown on the number line of the R component. Similarly, the level value SG of the G component of the shadow pixel and the level value HG of the G component of the highlight pixel are shown on the number line of the G component. Incidentally, here, SG is Smin. Besides, the level value SB of the B component of the shadow pixel and the level value HB of the B component of the highlight pixel are shown on the number line of the B component. Incidentally, here, HB is Hmax. In this embodiment, although Hmax is converted to Hdef, with respect to the remaining components, the distance from the minimum gradation value Tmin is multiplied by a factor of Q/P. Incidentally, Q is (Hdef−Tmin), and in FIG. 18A, Q indicates the length between Hdef and Sdef (=Tmin). P is (Hmax−Tmin), and in FIG. 18A, P indicates the length between Sdef and HB. That is, the distance is multiplied by the factor of Q/P while the ratio of the distances from the minimum gradation values Tmin of the respective components is held in the highlight pixel HL. Besides, although Smin is converted to Sdef, with respect to the remaining components, the distance from the maximum gradation value Tmax is multiplied by a factor of G/F. Incidentally, G is (Tmax−Sdef), and in FIG. 18A, G indicates the length between Hdef (=Tmax) and Sdef. F is (Tmax−Smin), and in FIG. 18A, F indicates the length between Hdef (=Tmax) and SG. Values of the respective components of the highlight pixel and the shadow pixel after the correction are shown in FIG. 18B.

Thereafter, with respect to each pixel other than the highlight pixel and the shadow pixel, a linear interpolation is carried out for each of the RGB components, and a conversion processing is carried out so that the pixel is placed between the highlight pixel (HR', HG', HB') and the shadow pixel (SR', SG', SB') after the correction. That is, the range correction unit 202 reads out the data of one pixel from the pixel table (step S99), and confirms that it is not the highlight pixel or the shadow pixel (step S101). In this processing, it is judged whether the read identifier of the pixel is identical to the pixel identifier stored in the pixel identifier column 1601 of the range correction table. If it is the highlight pixel or the shadow pixel, the processing proceeds to step S111.

On the other hand, in the case where it is not the highlight pixel and the shadow pixel, the red component (R) of the read pixel is linearly converted by using the red pixel value HR' of the highlight pixel after the correction and the red pixel value SR' of the shadow pixel after the correction (step S105). The level value HR of the red component of the highlight pixel before the correction, the level value HR' of the red component of the highlight pixel after the correction, the level value SR of the red component of the shadow pixel before the correction, and the level value SR' of the red component of the shadow pixel after the correction have been already obtained. In order to carry out the range correction of the red component R by the linear conversion, a plane having an input pixel value as X and an output pixel value as Y is considered, and with respect to coordinates of (X, Y), a linear expression of Y=aX+b passing through two points (SR, SR') and (HR, HR') has only to be prepared. An expression to obtain a primary straight line becomes as follow:

$$(Y-HR')=(HR'-SR')/(HR-SR)\times(X-HR) \tag{17}$$

This expression is modified as follow:

$$Y=(HR'-SR')/(HR-SR)\times X+(HR\times SR'-SR\times HR')/(HR-SR) \tag{18}$$

Figures 19, 20:
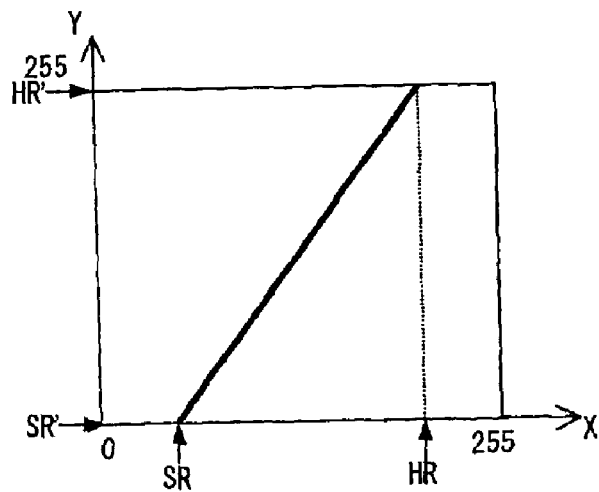
FIG. 19 is a diagram expressing a linear conversion function for the range correction.
FIG. 20 is a diagram showing an example of a conversion table (for red)

This straight line is shown in, for example, FIG. 19. However, Y=0 in a range from X=0 to X=SR. Besides, Y=255 in a range from X=HR to X=255. Incidentally, the horizontal axis is X and the vertical axis is Y.

For example, in the case of HR=220, HR'=255, SR=30, and SR'=0, a straight line function of the range correction can be obtained by the following expression.

$$(Y-255)=(255-0)/(220-30)\times(X-220) \tag{19}$$

$$Y=1.34X-40.26 \tag{20}$$

Since the value of the pixel component can take only an integer, a conversion table is prepared by using the expression (20). FIG. 20 shows an example of this conversion table. As shown in FIG. 20, the output pixel value Y (level value of the R component after the range correction) is an integer and is within the range of 0 to 255.

At the step S105, the conversion table as shown in FIG. 20 is prepared at the first processing, and subsequently, the value of the red component is treated as the input pixel value X and the output pixel value Y is obtained from the conversion table. The output pixel value Y is stored in the corrected red column 1704 of the pixel table.

Besides, the range correction unit 202 uses the green pixel value HG' of the highlight pixel after the correction and the green pixel value SG' of the shadow pixel after the correction to carry out the linear conversion of the green component (G) of the read pixel (step S107). The level value HG of the green component of the highlight pixel before the correction, the level value HG' of the green component of the highlight pixel after the correction, the level value SG of the green component of the shadow pixel before the correction, and the level value SG' of the green component of the shadow pixel after the correction have been already obtained. In order to carry out the range correction of the green component G by the linear conversion, a plane having an input pixel as X and an output pixel as Y is considered, and with respect to coordinates of (X, Y), a linear expression of Y=aX+b passing through two points (SG, SG') and (HG, HG') has only to be prepared. Since a method of obtaining the straight line is the same as that described above, it is not described here.

For example, in the case of HG=200, HG'=232, SG=50, and SG'=23.4, the following linear expression is obtained.

$$Y=1.39X-23.13 \tag{21}$$

Since a value of the pixel component can take only an integer, a conversion table is prepared by using the expression (21). FIG. 21 shows an example of this conversion table. As shown in FIG. 21, the output pixel value Y (level value of the G component after the range correction) is an integer and is within the range of 0 to 255.

At the step S107, the conversion table as shown in FIG. 21 is prepared at the first processing, and subsequently, the value of the green component is treated as the input pixel value X and the output pixel value Y is obtained from the conversion table. The output pixel value Y is stored in the corrected green column 1705 of the pixel table.

The range correction unit 202 uses the blue pixel value HB' of the highlight pixel after the correction and the blue pixel value SB' of the shadow pixel after the correction to carry out the linear conversion of the blue component (B) of the read pixel (step S109). The level value HB of the blue component of the highlight pixel before the correction, the level value HB' of the blue component of the highlight pixel after the correction, the level value SB of the blue component of the shadow pixel before the correction, and the level value SB' of the blue component of the shadow pixel after the correction have been already obtained. In order to carry out the range correction of the blue component B by the linear conversion, a plane having an input pixel as X and an output pixel as Y is considered, and with respect to coordinates of (X, Y), a linear expression of Y=aX+b passing through two points (SB, SB') and (HB, HB') has only to be prepared. Since a method of obtaining the straight line is the same as that described above, it is not described here.

For example, in the case of HB=180, HB'=209, SB=70, and SB'=46, the following linear expression is obtained.

$$Y=1.48X-11.73 \tag{22}$$

Since the value of the pixel component can take only an integer, a conversion table is prepared by using the expression (22). FIG. 22 shows an example of this conversion table. As shown in FIG. 22, an output pixel value Y (level value of the B component after the range correction) is an integer and is within the range of 0 to 255.

At the step S109, the conversion table as shown in FIG. 22 is prepared at the first processing, and subsequently, the value of the blue component B is treated the input pixel value X, and the output pixel value Y is obtained from the conversion table. The output pixel value Y is stored in the corrected blue column 1706 of the pixel table. Incidentally, the order of the step S105 to step S109 can be shifted.

Then, the range correction unit 202 judges whether or not all the pixels are processed (step S111). If there is an unprocessed pixel, a next pixel is read out (step S103), and the processing proceeds to the step S101. On the other hand, in the case where all the pixels are processed, the process image after the range correction is outputted to the image storage DB 35 and is stored (step S113). Incidentally, the image is not outputted to the image storage DB 35, but maybe outputted to the main portion estimation unit 204.

In the range correction processing relating to this embodiment, the color image of the RGB is subjected to the range correction as it is. Besides, the maximum level value Hmax (that is, the highest gradation component in all the pixels) of the component of the highlight pixel, and the minimum level value Smin (that is, the lowest gradation component in all the pixels) of the component of the shadow pixel are grasped, and both are designed not to exceed the range width (for example, from 0 to 255). By carrying out the processing like this, there does not occur a phenomenon in which color becomes white, caused by the conventional range correction method which neglects the color balance, and it becomes unnecessary to carry out a pushing processing of a pixel having gone out of a color range, which is a problem in a method of carrying out a range conversion once by the LCH format as in Japanese Patent Unexamined Publication No. Hei. 8-32827 cited as the background art.

Further, in the range correction processing of this embodiment, at the time of the range correction, the RGB ratio of the highlight pixel and the RGB ratio of the shadow pixel are held in different forms, and with respect to the highlight pixel, the ratio of distances from the minimum pixel values to the level values of the respective components as to each of the RGB is held, and with respect to the shadow pixel, the ratio of distances from the maximum pixel values to the level values of the respective components is held.

As a result, for example, in the case where the highlight pixel is red (R, G, B)=(150, 100, 100), the pixel becomes, for example, (R, G, B)=(200, 133, 133) by the range correction, and the red clearer and livelier than that before the correction can be obtained. In the case where the shadow pixel is yellow (R, G, B)=(100, 100, 50), the pixel becomes, for example, (R, G, B)=(77, 77, 20) by the range correction, and the yellow darker and livelier than that before the correction can be obtained.

As described above, the highlight pixel after the range correction becomes livelier than that before the correction, and the shadow pixel after the range correction also becomes livelier than that before the correction. With respect to a pixel having a value between a value of the highlight pixel and that of the shadow pixel, the range correction is carried out by linearly making a proportional calculation of a value between a value of the highlight pixel after the range correction and that of the shadow pixel after the range correction, and the pixel can be made lively.

3. Main Portion Estimation Processing

With respect to the image subjected to the range correction by the range correction processing, the main portion estimation unit 204 carries out a processing described below with reference to FIGS. 23 to 31. Here, estimation of a portion to be noticed and a main object in an image is carried out.

Figure 23:
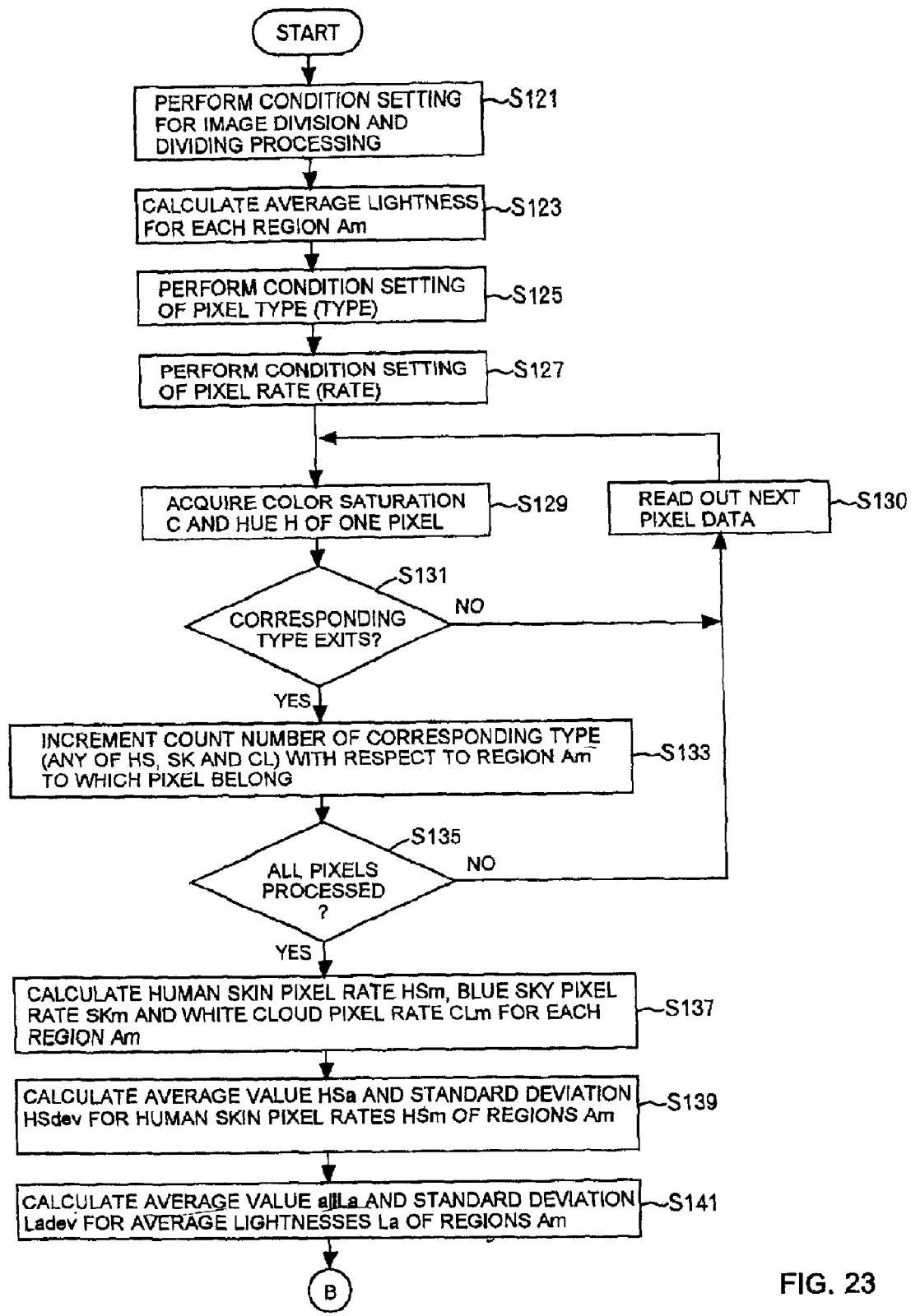
FIG. 23 is a flowchart showing a first processing flow of a main portion estimation processing.

FIG. 23 shows a processing flow of the main portion estimation processing. The main portion estimation unit 204 carries out condition setting of image division and a dividing processing as to a process image (step S121). For example, the number of divisions is set, and in accordance with the set number of divisions, the process image is divided into, for example, small regions Am respectively having the same area. That is, records (lines) are generated in a reference importance level table in accordance with the set number of divisions, and a region number of each of the regions Am is registered in a region (number) column. Besides, information relating to identification numbers of pixels included in each of the regions Am is also registered in an objective pixel column 2401. Further, the number of pixels included in each of the regions Am is registered in a pixel count column. The number of the small regions may be fixed or may be instructed by the operator for every process image.

FIG. 24 shows an example of the reference importance level table. In the example of FIG. 24, there are provided a region column 2400 for storing the number of each of the regions Am, an objective pixel column 2401 for storing information as to a range of identification numbers of pixels belonging to each of the regions Am, a column 2402 of the number of pixels included in each of the regions Am, a human skin pixel count column 2403 for storing the number of human skin pixels HS of each of the regions Am, a blue sky pixel count column 2404 for storing the number of blue sky pixels SK of each of the regions Am, a with cloud pixel count column 2405 for storing the number of white cloud pixels CL of each of the regions Am, a column 2406 of average lightness La of each of the regions Am, a column 2407 of a human skin pixel rate HSm of each of the regions Am, a column 2408 of a blue sky pixel rate SKm of each of the regions Am, a column 2409 of a white cloud pixel rate CLm of each of the regions Am, and a reference level column 2410 for storing a reference importance level of each of the regions Am.

Next, the main portion estimation unit 204 calculates average lightness La of each of the regions Am (step S123). The information as to the identification numbers of the pixels included in each of the regions Am is acquired from the objective pixel column 2401 by referring to the reference importance level table, the data of the pixels is acquired from, for example, the pixel table as shown in FIG. 17, and lightness values L of the respective pixels are calculated. In the case where the lightness values L of the respective pixels are already stored in the pixel table, they are read out. Then, the average lightness La is calculated. The calculated average lightness La is stored in the column 2406 of the average lightness La in the reference importance level table.

Besides, the main portion estimation unit 204 carries out condition setting of a pixel type (Type) (step S125). For example, in accordance with the input of the operator, with respect to the pixel HS expected to be a human skin, the pixel SK expected to be a blue sky, and the pixel CL expected to be a white cloud, the conditions of the hue and the color saturation of each of them are set. This condition setting may be made in accordance with the setting instructions of the operator, or previously set values may be used, or fixed values may be set in a program. The contents of the condition setting of the pixel type are registered in a pixel type condition table. FIG. 25 shows an example of the pixel type condition table. In the example of FIG. 25, the table includes a type (Type) column 2500 for storing the respective types of the human skin pixel HS, the blue sky pixel SK and the white cloud pixel CL, a color saturation range column 2501 for storing a color saturation range C for each pixel type, and a hue range column 2502 for storing a hue range H for each pixel type. At step S125, with respect to each pixel type, data as to the color saturation range and the hue range are stored in the column 2501 of the color saturation range C and the column 2502 of the hue range H.

Next, the main portion estimation unit 204 carries out the condition setting as to a pixel rate (Rate) (step S127). For example, in accordance with the input of the operator, the estimation unit sets a reference value HSdef of a rate at which the human skin pixel HS is contained in the small region Am, a reference value HSdevK of a standard deviation of the rate at which the human skin pixel HS is contained in the small region Am, a reference value LadevK of a standard deviation of the average lightness La, a reference value SKdef of a rate at which the blue sky pixel SK is contained in the small region Am, and a reference value CLdef of a rate at which the white cloud pixel CL is contained in the small region Am. This condition setting may also follow the setting instructions of the operator, or previously set values may be used, or fixed values may be set in a program. The contents of the condition setting as to the pixel rate are registered in a reference pixel rate table.

FIG. 26 shows an example of the reference pixel rate table. In the example of FIG. 26, there are provided a type column 2600 for storing the reference value HSdef of the rate of the human skin pixel HS, the reference value HSdevK of the standard deviation of the human skin pixel HS, the reference value LadevK of the standard deviation of the average lightness La, the reference value SKdef of the rate of the blue sky pixel SK, and the reference value CLdef of the rate of the white cloud pixel CL, and a value column 2601 for storing numerical values of the reference values. At step S127, numerical values of the reference values are stored.

The main portion estimation unit 204 acquires data of the color saturation C and the hue H of a pixel (step S129). For example, data of one pixel is read out from the pixel table, and values of the color saturation C and the hue H are calculated from the data. If the values of the color saturation C and the hue H are stored in the pixel table in advance, the values are read out. Besides, it is judged to which of, as the pixel type, the human skin pixel HS, the blue sky pixel SK, and the white cloud pixel CL the pixel corresponds (step S131). By using the values of the color saturation C and the hue H of the pixel and the data registered in the column 2501 of the color saturation range C and the column 2502 of the hue range H in the pixel type condition table with respect to the human skin pixel HS, the blue sky pixel SK and the white cloud pixel CL, it is judged to which of the human skin pixel HS, the blue sky pixel SK, and the white cloud pixel CL the pixel corresponds. In the case where the pixel does not correspond to any types, data of a next pixel is read out, and the processing is returned to the step S129 (step S130).

On the other hand, in the case where the corresponding pixel type exists, the main portion estimation unit 204 detects the small region Am to which the pixel belongs, and increments the count number of the pixel type with respect to the detected small region Am (step S133). By using the pixel identifier of the pixel and the data registered in the objective pixel column 2401 of the reference importance level table, the region number is identified. Then, a value at the line of the corresponding small region Am in the human skin pixel count column 2403, the blue sky pixel count column 2404, or the white cloud pixel count column 2405 of the reference importance level table is incremented.

Then, it is judged whether all the pixels are processed (step S135). In case an unprocessed pixel exists, the procedure proceeds to the step S130. On the other hand, in the case where all the pixels are processed, the human skin pixel rate HSm, the blue sky pixel rate SKm, and the white cloud pixel rate CLm are calculated for each of the small regions Am (step S137). At the step S133, with respect to each of the small regions Am, the human skin pixel count, the blue sky pixel count, and the white cloud pixel count are stored in the human skin pixel count column 2403, the blue sky pixel count column 2404, and the white cloud pixel count column 2405, and when they are divided by the number of pixels of each of the small regions Am registered in the pixel count column 2402 of the reference importance level table, each rate can be calculated. The human skin pixel rate HSm is registered in the column 2407 of the human skin pixel rate HSm, the blue sky pixel rate SKm is registered in the column 2408 of the blue sky pixel rate SKm, and the white pixel rate CLm is registered in the column 2409 of the white cloud rate CLm.

The main portion estimation unit 204 calculates an average value HSa and a standard deviation value HSdev from the human skin pixel rates HSm of all the small regions Am (step S139). That is, by using numerical values registered in the column 2407 of the human skin pixel rate HSm of the reference importance level table, the average value HSa and the standard deviation value HSdev are calculated, and are registered at a line of the average value HSa of the human skin pixel rate HSm and a line of the standard deviation HSdev of the human skin pixel rate HSm of a calculated pixel rate table. FIG. 27 shows an example of the calculated pixel rate table. In the example of FIG. 27, the table includes a type column 2700 for storing the average value HSa of the human skin pixel rate HSm, the standard deviation HSdev of the human skin pixel rate HSm, the average value allLa of the average lightnesses La, and the standard deviation Ladev of the average lightness La, and a value column 2701 for storing values of average values and standard deviation values.

Next, the main portion estimation unit 204 calculates the average value allLa of the average lightnesses La and the standard deviation Ladev of the average lightness La from the average lightnesses La of all the small regions Am (step S141). The data is read out from the column 2406 of the average lightness La in the reference importance level table, and the average value allLa of the average lightnesses La and the standard deviation Ladev can be calculated. The calculation results are registered at the line of the average value allLa of the average lightnesses La and the line of the standard deviation Ladev of the average lightnesses La in the calculation pixel rate table.

Figure 28:
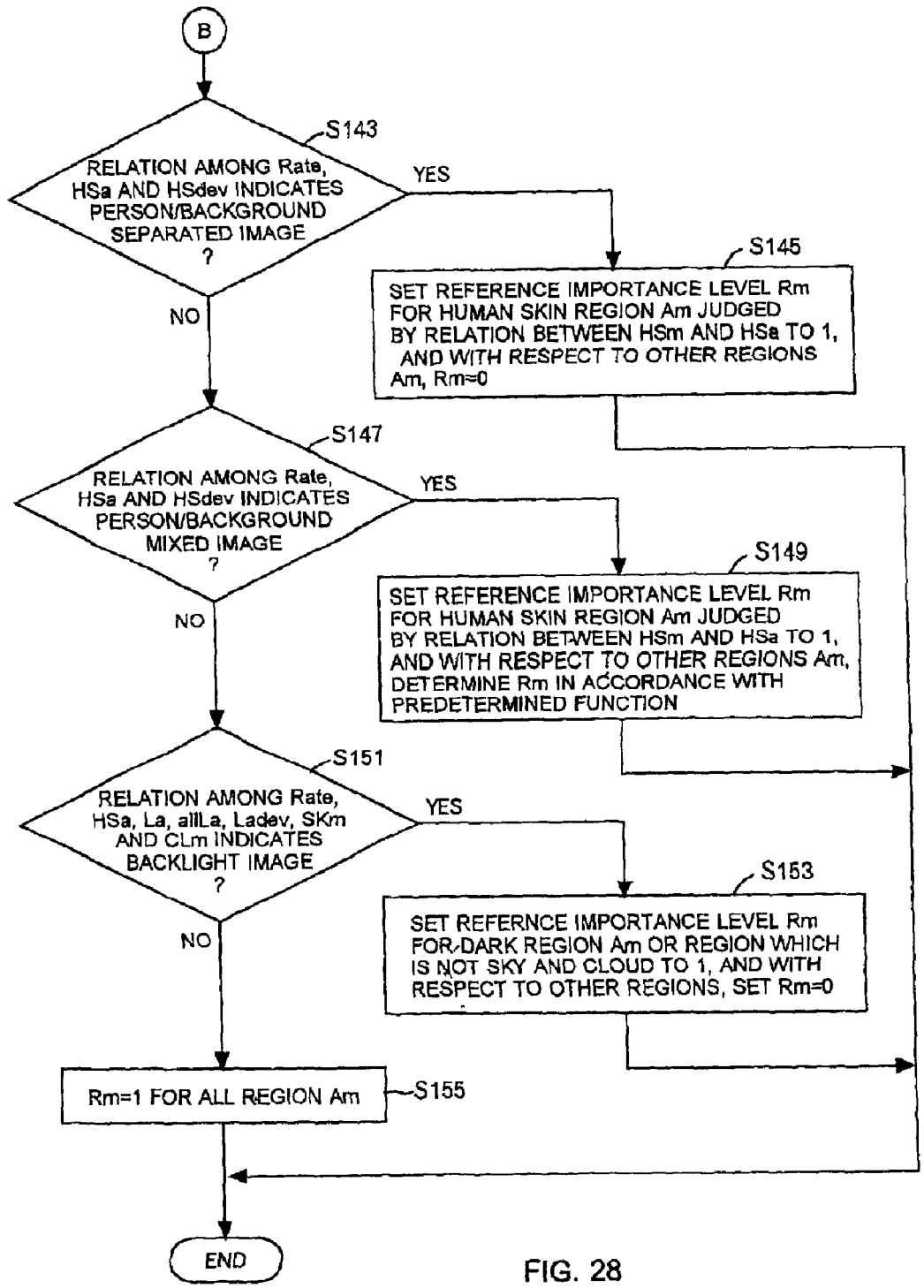
FIG. 28 is a flowchart view showing a second processing flow of the main portion estimation processing.
Figure 29A:
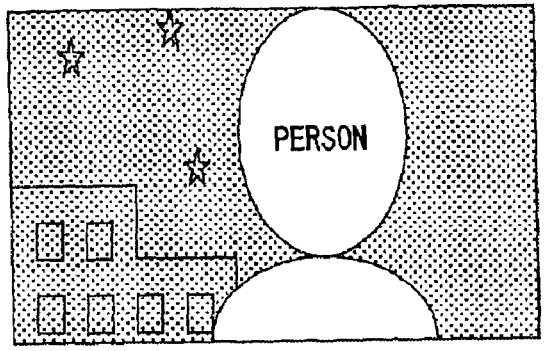
FIGS. 29A, 29B, 29C and 29D are diagrams showing types of images judged by the main portion estimation processing.
Figure 29B:
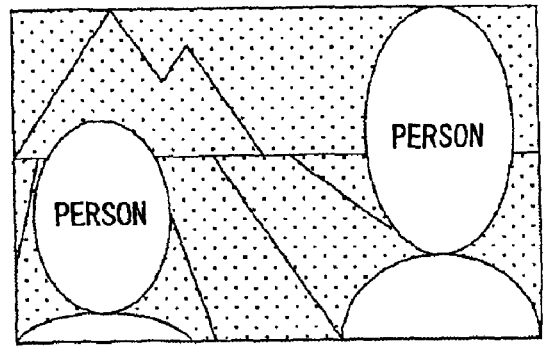
Figure 29C:
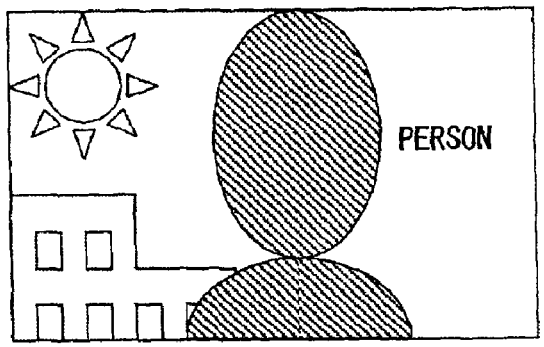
Figure 29D:
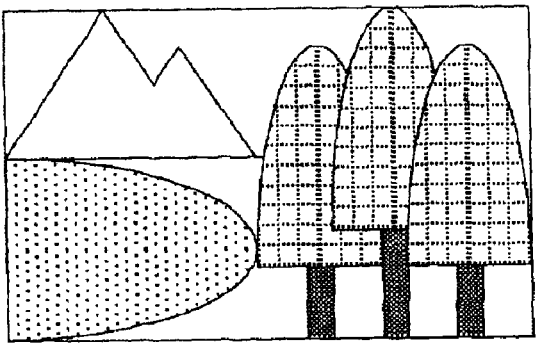

The processing proceeds to FIG. 28 through a terminal B. In FIG. 28, the numerical values calculated in the processing flow of FIG. 23 are used to classify the process image into four kinds of (a) an image where a person and a background are separated from each other (for example, an image as shown in FIG. 29A), (b) an image in which a person and a background are mixed with each other (for example, an image as shown in FIG. 29B), (c) a rather backlight image (for example, an image as shown in FIG. 29C), and (d) the other general image (for example, an image as shown in FIG. 29D).

The image (a) in which the person and the background are separated from each other indicates an image in which the person and the background portion are definitely separated from each other. The image indicates, as shown in the example of FIG. 29A, a portrait image in which a flash is used and a face of one person is arranged in close-up against the background of a night scene. The image (b) in which the person and the background are mixed with each other indicates an image in which the person and the background are not definitely separated from each other but are mixed with each other. The image indicates, as shown in the example of FIG. 29B, a snapshot image in which a plurality of people are arranged against the background of a natural scene. The rather backlight image(c) indicates an image in which a very bright portion and a very dark portion occupy a large part of an image area. As shown in the example of FIG. 29C, it indicates an image photographed in a fine outdoor backlight state. The image (d) indicates a general image, which does not belong to (a) to (c) for example, as shown in FIG. 29D, it indicates a natural scene image photographed in a forward light state.

Next, it is judged whether the relation among the reference values of the pixel rate (Rate: here, the reference value HSdef of the human skin pixel rate and the reference value HSdevK of the standard deviation of the human skin pixel rate), the average value HSa of the human skin pixel rate HSm, and the standard deviation HSdev of the human skin pixel rate HSm satisfies the condition of the image (a) in which the person and the background are separated (step S143). That is, it is judged whether the following condition 1 is satisfied.

$$HSa>HSdef \text{ and } HSdev>HSdevK \qquad \text{(condition 1)}$$

It is judged whether the condition 1 is satisfied, by using the reference value HSdef of the human skin pixel rate and the reference value HSdevK of the standard deviation of the human skin pixel rate registered in the reference pixel rate table, and the average value HSa of the human skin pixel rate HSm and the standard deviation HSdev of the human skin pixel rate HSm registered in the calculated pixel rate table. If the condition 1 is satisfied, in the example of FIG. 26, it means that the human skin pixel estimated to be a person exists at a rate of average 50% or higher in all regions, a small region Am having a high rate of the human skin pixel and a small region Am having a small rate of the human skin pixel exist, and a difference in the human skin pixel rate is large among the respective small regions.

If the condition 1 is not satisfied, next, the main portion estimation unit 204 judges whether the relation among the reference values of the pixel rates (Rate: here, the reference value HSdef of the human skin pixel rate and the reference value HSdevK of the standard deviation of the human skin pixel rate), the average value HSa of the human skin pixel rate HSm and the standard deviation HSdev of the human skin pixel rate HSm satisfies the condition of the image (b) in which the person and the background are mixed (step S147). That is, it is judged whether the following condition 2 is satisfied.

$$HSa>HSdef \text{ and } HSdev \leq HSdevK \qquad \text{(condition 2)}$$

Similarly to the condition 1, it is judged whether the condition 2 is satisfied, by using the reference value HSdef of the human skin pixel rate and the reference value HSdevK of the standard deviation of the human skin pixel rate registered in the reference pixel rate table, and the average value HSa of the human skin pixel rate HSm and the standard deviation HSdev of the human skin pixel rate HSm registered in the calculated pixel rate table. In case the condition 2 is satisfied, in the example of FIG. 26, it means that although the human skin pixels estimated to be a person image exists at a rate of average 50% or higher in all regions, as compared with the image of (a), a difference in the rate HSm of the human skin pixel is small among the small regions.

In case the condition 2 is not satisfied, the main portion estimation unit 204 judges whether it is the rather backlight image (c), from the relation among the reference values of the pixel rates (Rate: here, the reference value HSdef of the human skin pixel rate, the reference value LadevK of the standard deviation of the average lightness La, the reference value SKdef of the blue sky pixel rate, and the reference value CLdef of the white cloud pixel rate), the average value HSa of the human skin pixel rate, the average value allLa of the average lightnesses La, the standard deviation Ladev of the average lightness La, the blue sky pixel rate SKm, and the white cloud pixel rate CLm (step S151). That is, it is judged whether the following condition 3 is satisfied.

There is at least one region Am in which SKm>SKdef is satisfied in the small regions Am in which HSa≦HSdef, Ladev>LadevK, and La>allLa are satisfied, or $$\text{there is at least one region Am in which CLm>CLdef is satisfied} \\ \text{in the small regions Am in which HSa}\leq\text{HSdef,} \\ \text{Ladev>LadevK, and La>allLa are satisfied} \qquad \text{(condition 3)}.$$

The reference value HSdef of the human skin pixel rate, the reference value HSdevK of the standard deviation of the average lightness, the reference value SKdef of the blue sky pixel rate, and the reference value CLdef of the white cloud pixel rate are read out from the reference pixel rate table. Besides, the average value HSa of the human skin pixel rate HSm and the standard deviation Ladev of the average lightness are read out from the calculated pixel rate table.

The average lightness La of each of the small regions Am, the blue sky pixel rate SKm, and the white cloud pixel rate CLm are read out from the average lightness column 2406, the blue sky pixel rate column 2408, and the white cloud pixel rate column 2409 of the reference importance level table.

The condition 3 indicates that in the case where the average HSa of the human skin pixel rate is lower than the reference and the rate of the pixel estimated to be a person is low, and the standard deviation Ladev of the average lightness is higher than the reference and the light and shade are definite between the small regions, if, in the small region Am having the average lightness La exceeding the average value allLa of the average lightnesses La, the rate SKm of the blue sky pixel exceeds the reference and the blue sky is largely included, the process image is estimated to be the rather backlight image. Besides, in the case where the average HSa of the human skin pixel rate is lower than the reference and the rate of the pixel estimated to be a person is low, and the standard deviation Ladev of the average lightness exceeds the reference and the light and shade are definite between the small regions, if, in the small region Am having the average lightness La exceeding the average value allLa of the average lightnesses La, the rate CLm of the white cloud pixel exceeds the reference and the white cloud is largely included, the pixel is estimated to be the rather backlight image.

In case the condition 3 is not satisfied, it is judged that the process image is the other general image (e). This indicates the other general image in which there is no element estimated to be a person image, and the light and shade are not definite among the small regions, or there are not many pixels estimated to be the blue sky or the white cloud.

When the image type is specified through the above conditions 1 to 3, at step S145, step S149 and step S153, the reference importance level Rm adapted for each image type is given to every small region Am.

Figure 30A:
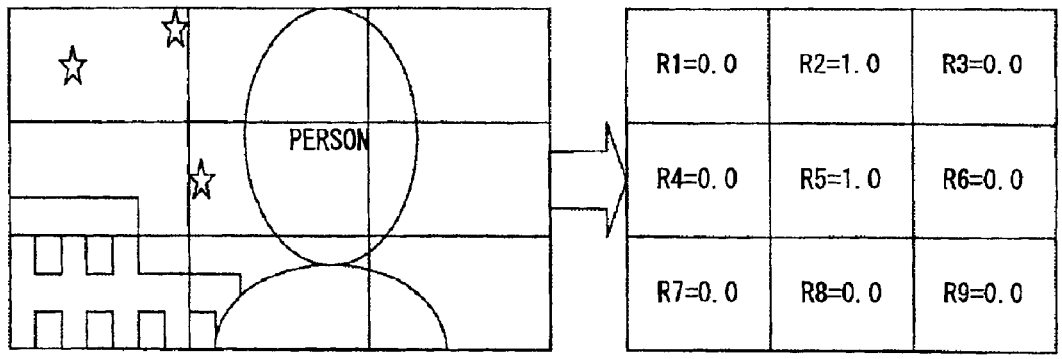
FIGS. 30A, 30B, 30C and 30D are diagrams showing examples of reference importance levels given to the images of FIGS. 29A to 29D.

At the step S143, in the case where the image is judged to be the image (a) in which the person and the background are separated from each other, if the region is judged to be the human skin region Am from the relation between the human skin pixel rate HSm and the average value HSa of the human skin pixel rate, the reference importance level is made Rm=1, and with respect to the other region Am, Rm=0 (step S145). That is, in the region where HSm≧HSa, the reference importance level is made Rm=1, and in the region of HSm<HSa, the reference importance level is made Rm=0. To give the reference importance level Rm means that the high reference importance level Rm(=1) is given to only the small region Am having a high rate of the human skin pixel HS, and attention is not paid to the other regions. As a result, in the case where the image as shown in FIG. 29A is divided as shown in the left of FIG. 30A, the reference importance levels as shown in the right of FIG. 30A are given. That is, the reference importance level Rm is set to 1 only in the small region including the person largely.

The human skin pixel rate HSm is read out from the column 2407 of the human skin pixel rate HSm in the reference importance level table, and the average value HSa of the human skin pixel rate is read out from the calculated pixel rate table. The given reference importance level Rm of each small region is stored in the column 2410 of the reference importance level Rm in the reference importance level table.

At the step S147, in the case where the image is judged to be the image (b) in which the person and the background are mixed with each other, if the region is judged to be the human skin region Am from the relation between the human skin pixel rate HSm and the average value HSa of the human skin pixel rate, the reference importance level is made Rm=1, and with respect to the other region Am, the reference importance level Rm determined by a function set forth below is given (step S149). The function is expressed by the following expression.

$$H(HSdev) = (HSdevK - HSdev)/HSdevK \qquad (23)$$

In the expression (23), in the case where the standard deviation HSdev of the human skin pixel rate has the same value as the reference value HSdevK of the standard deviation of the human skin pixel rate, the level becomes 0, and in the case where it is smaller than the reference value HSdevK of the standard deviation of the human skin pixel rate, the reference importance level Rm becomes high. Incidentally, the reference importance level does not become less than 0 by the condition to proceed to step S149.

Figure 30B:
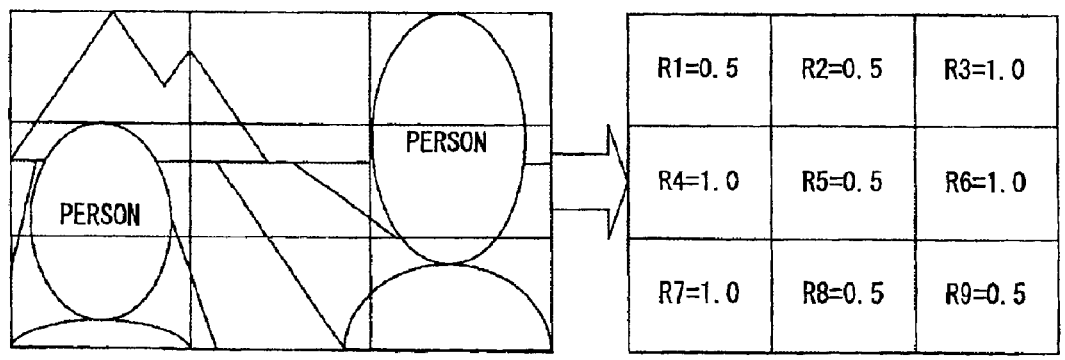

For example, in the image judged to be the image (b) in which the person and the background are mixed with each other, if the average value HSa of the human skin pixel rate HSm of all the small regions is 0.60, and the standard deviation HSdev is 0.10, the reference importance level Rm becomes 0.5. As a result, in the case where the image as shown in FIG. 29B is divided as shown in the left of FIG. 30B, the reference importance levels Rm as shown in FIG. 30B are given. In the region including many human skin pixels, the reference importance level becomes Rm=1, and in the regions other than that, the level becomes a value (here, 0.5) calculated in accordance with the expression (23).

Incidentally, the human skin pixel rate HSm is read out from the column 2407 of the human skin pixel rate HSm in the reference importance level table, and the average value HSa of the human skin pixel rate is read out from the calculated pixel rate table. Besides, the standard deviation HSdev of the human skin pixel rate is read out from the calculated pixel rate table, and the reference value HSdev of the standard deviation of the human skin pixel rate is read out from the reference pixel rate table. The given reference importance level Rm of each small region is stored in the column 2410 of the reference importance level Rm in the reference importance level table.

At the step S151, in the case where the image is judged to be the rather backlight image (c) from the relation among the average lightness La, the average value allLa of the average lightnesses, the blue sky pixel rate SKm, the white cloud pixel rate CLm, and the reference values of the pixel rates (Rate: here, the reference value SKdef of the blue sky pixel rate and the reference value CLdef of the white cloud pixel rate), the reference importance level Rm=1 is given to the dark region Am and the region Am which is not the blue sky and the white cloud, and Rm=0 is given to the other regions (step S153).

Figure 31:
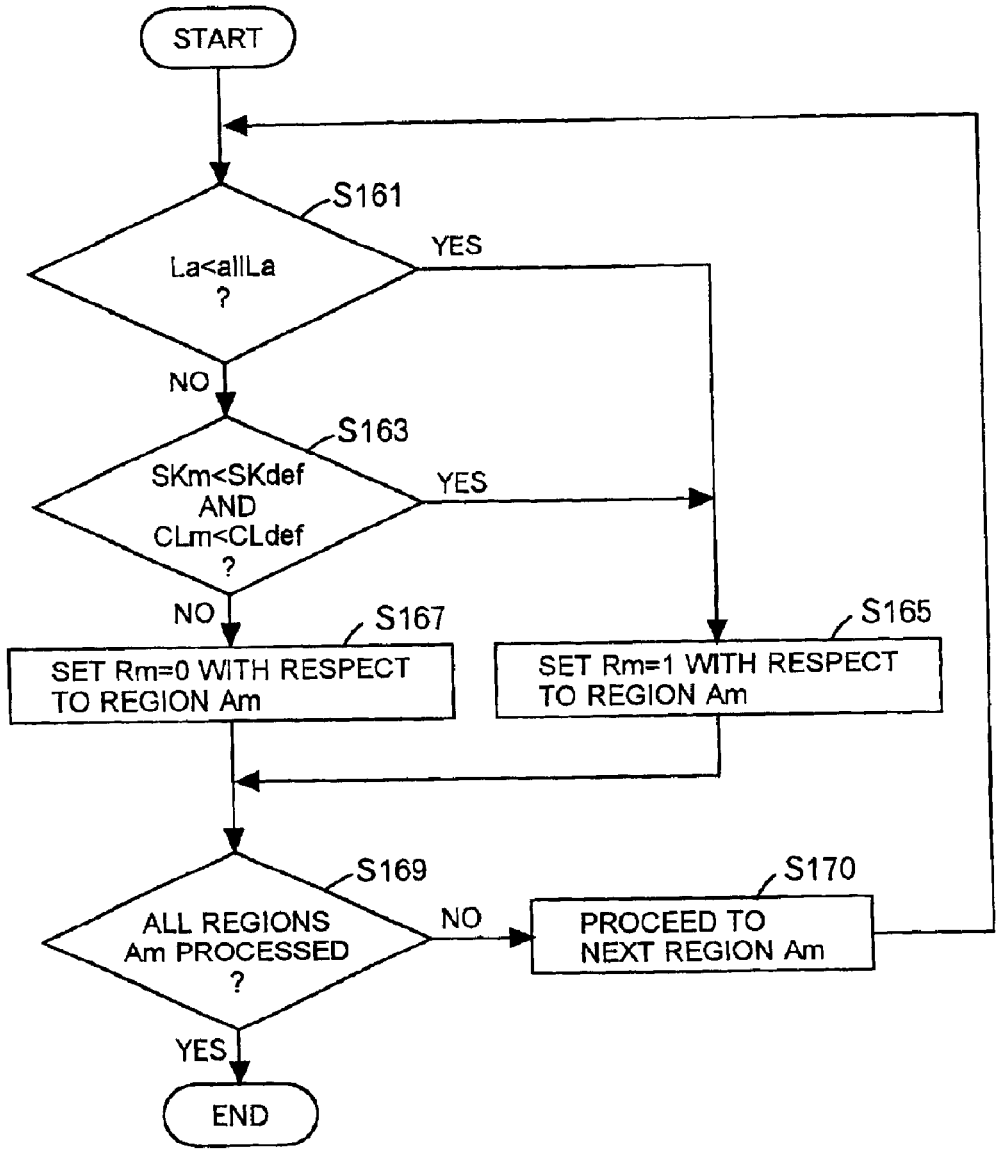
FIG. 31 is a flowchart showing a processing flow for giving a reference importance level to each small region with respect to a rather backlight image.

A detailed processing of giving the reference importance level at the step S153 will be described with reference to FIG. 31. First, the lightness average La of a small region Am is compared with the average value allLa of the lightness averages in all the small regions, and it is judged whether La<allLa is satisfied (step S161). If this condition is satisfied, it is indicated that the small region is dark as compared with the whole image. That is, the region is estimated to be the dark portion due to the backlight. In the case where such condition is satisfied, Rm=1 is set for the small region Am (step S165). The lightness average La is read out from the lightness average column 2406 of the reference importance level table, and the average value allLa of the lightness averages is read out from the calculated pixel rate table. The reference importance level Rm is registered in the reference level column 2410 of the reference importance level table.

In case the condition of the step S161 is not satisfied, it is judged whether or not the blue sky pixel rate SKm of the small region Am and the reference value SKdef of the blue sky pixel rate satisfy SKm<SKdef, and the white pixel rate CLm of the small region Am and the reference value CLdef of the white pixel rate satisfy CLm<CLdef (step S163). If this condition is satisfied, it is a region, which is not the dark portion, not the white cloud, and not the blue sky. In the case of such a region, the processing proceeds to step S165, and the reference importance level Rm=1 is given. Here, the blue sky pixel rate SKm is read out from the blue sky pixel rate column 2408 of the reference importance level table, and the white cloud pixel rate CLm is read out from the white cloud pixel rate column of the reference importance level table. The reference value SKdef of the blue sky pixel rate and the reference value CLdef of the white cloud pixel rate are read out from the reference pixel rate table.

On the other hand, in case the condition of the step S163 is not satisfied, Rm=0 is given (step S167). That is, it indicates that attention is not paid to the small region Am that does not satisfy the conditions of the step S161 and the step S163.

Then, it is judged that all the small regions Am are processed (step S169), and if an unprocessed small region exists, the processing proceeds to a next region Am (step S170), and is returned to the step S161. In case all the regions are processed, the processing is ended.

Figure 30C:
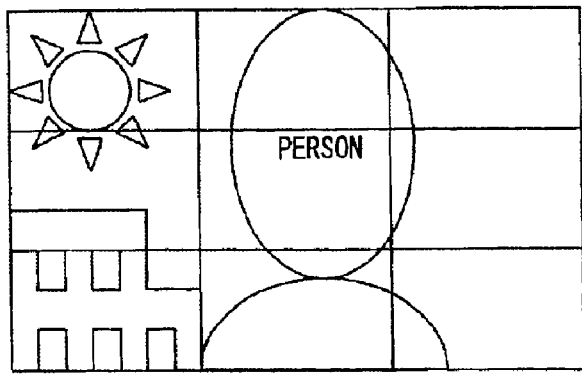

For example, in the case where the image as shown in FIG. 29C is divided as shown in FIG. 30C, a portion of a person which becomes dark due to the backlight is given the reference importance level Rm=1, and Rm=0 is set for the remaining regions.

Figure 30D:
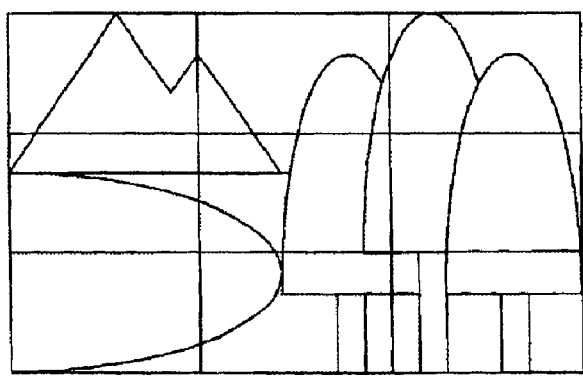

In case the image is judged to be the other general image (d), the reference importance level Rm=1 is given to all regions (step S155). That is, it means that attention is equally paid to all the regions. As a result, in the case where the image as shown in FIG. 29D is divided as shown in the left of FIG. 30D, the reference importance level Rm=1 is given to all the regions. The given reference importance level Rm is registered in the reference level column 2410 of the reference importance level table.

In this embodiment, a process image is classified into the person image (the person/background separated image or the person/background mixed image), the backlight image, and the other general image, and after a main region and a not-main region are specified, values of the reference importance levels Rm are given, which become different for the respective regions. When the value of the reference importance level Rm is high, it indicates that the region is important in the image, and in the case of the person image, the reference importance level of the person region is high, and in the case of the backlight image, the reference importance level of the dark smashed region is high. In the case of the other general image, since the whole image is the main region, the reference importance level becomes a uniform value.

Like this, by the reference importance level, the main region is determined after the image classification, and if an image correction reflecting the reference importance level for each region is carried out, a more accurate image correction can be realized. For example, a tone correction set forth below can be carried out by using the reference importance level. However, the use of the reference importance level Rm is not limited to the tone correction, and there are other usages, for example, a correction processing may be carried out using a filter corresponding to a value of the reference importance level Rm.

4. Tone Correction

The tone correction unit 206 carries out a tone correction for adjustment of brightness and contrast in the form of reflecting the value of the reference importance level Rm of each small region Am of the process image, which is given by the main portion estimation unit 204.

In this embodiment, an image state of the process image is judged, a curve of the tone correction suitable for the judged image state is selected, and a curve conversion processing is carried out for the process image by using the selected curve.

Figures 32A, 32B, 32C:
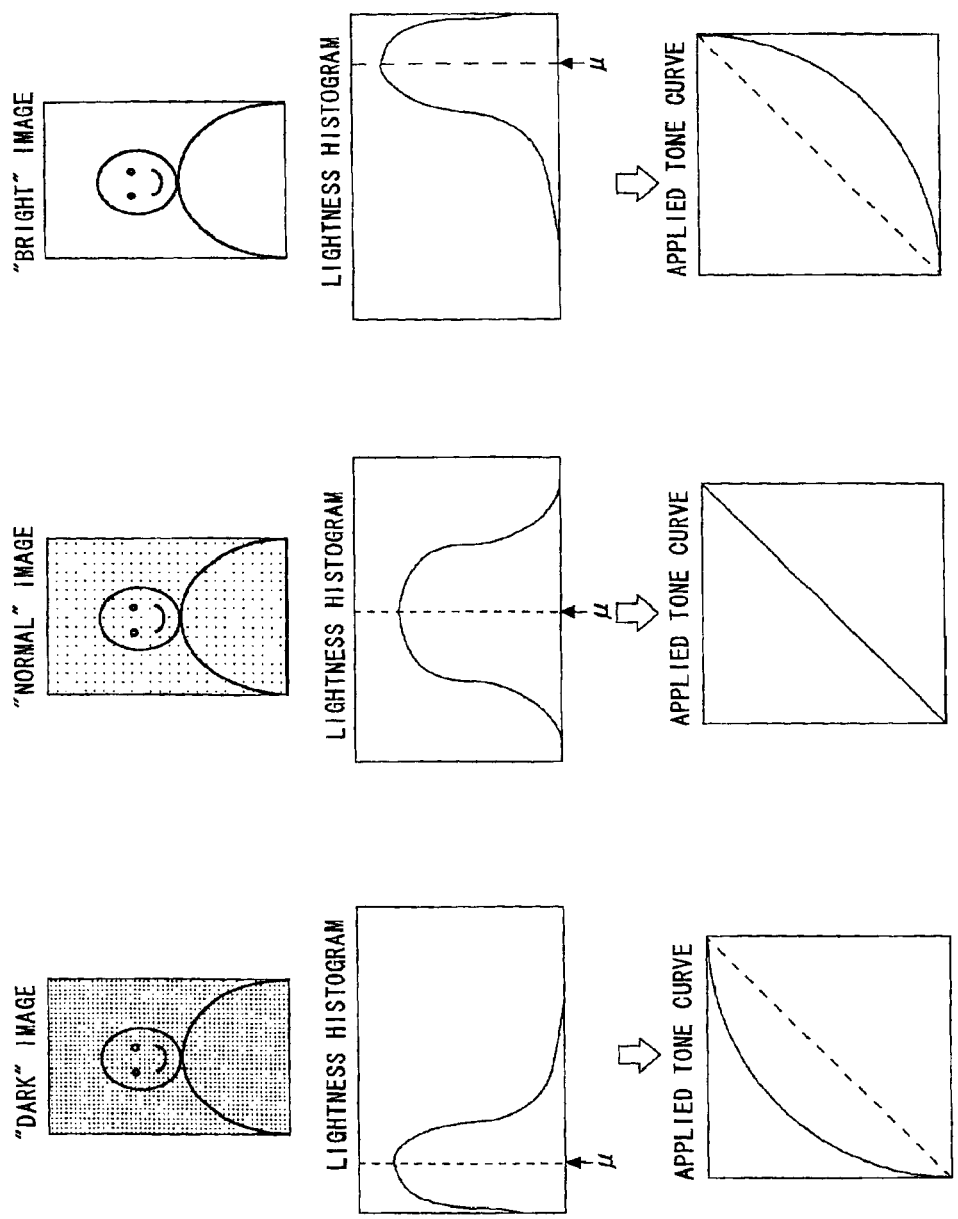
FIGS. 32A, 32B and 32C are diagrams each showing a relation among an image state, a brightness average value $\mu$, and an applied tone curve.

The image state can be classified into "dark", "normal" and "bright" with respect to the brightness, and can be classified into "high", "normal" and "low" with respect to the contrast. The brightness of the image correlates with a lightness average value $\mu$ of the process image. The "dark" image has a low lightness average value $\mu$, the "bright" image has a high lightness average value $\mu$, and the "normal" image has an intermediate value of these. FIGS. 32A to 32C show this example. FIG. 32A shows an example of the "dark" image at its upper stage, and shows a lightness histogram of the "dark" image at its middle stage. Like this, in the "dark" image, the lightness values of many pixels have low levels, and the lightness average value $\mu$ also has a low value. FIG. 32B shows an example of the "normal" image at its upper stage, and shows a lightness histogram of the "normal" image at its middle stage. Like this, in the "normal" image, the lightness values of many pixels have intermediate levels, and the lightness average value $\mu$ also has an intermediate value. FIG. 32C shows an example of the "bright" image at its upper stage, and shows a lightness histogram of the "bright" image at its middle stage. Like this, in the "bright" image, the lightness values of many pixels have high levels, and the lightness average value $\mu$ also has a high value.

In the tone correction as to such image states, a pixel conversion is carried out by applying a tone curve, which makes an image bright, to the "dark" image, a tone curve, which makes an image dark, to the "bright" image, and a tone curve, which does not change the lightness, to the "normal" image.

In the case of FIGS. 32A to 32C, the tone curve as shown at the lower stage is applied. In the case of the "dark" image as shown in FIG. 32A, the upward convex tone curve to make a pixel bright is used. In the "normal" image as shown in FIG. 32B, the tone curve not to make the pixel conversion is used. In the "bright" image as shown in FIG. 32C, the downward convex tone curve to make a pixel dark is used.

In this embodiment, in the calculation of the lightness average value $\mu$, by taking the reference importance level set by the main portion estimation unit 204 into consideration, the lightness average value $\mu$ is calculated. That is, the calculation is made in accordance with the following expression.

$$\mu = \sum_{m=1}^{9} \left( \frac{\mu_m \times Rm}{\sum_{n=1}^{9} Rn} \right) \quad (24)$$

The contrast of the image correlates with the standard deviation $\sigma$ of the lightness of the process image. The image having "low" contrast has a low standard deviation of the lightness, the "high" image has a high standard deviation of the lightness, and the "normal" image has an intermediate value of these. FIGS. 33A to 33C show examples of this. FIG. 33A shows an example of the "low" contrast image at its upper portion and shows a lightness histogram of the "low" contract image at its middle stage. In the "low" contrast image like this, a dispersion (standard deviation σ) from the lightness average value μ is small. FIG. 33B shows an example of the "normal" contrast image at its upper stage and shows a lightness histogram of the "normal" contrast image at its middle stage. In the "normal" contrast image like this, a dispersion (standard deviation σ) from the lightness average value μ is middle. Further, FIG. 33C shows an example of the "high" contrast image at its upper stage and shows a lightness histogram of the "high" contrast image at its middle stage. In the "high" contrast image like this, a dispersion (standard deviation σ) from the lightness average value μ is large.

In the tone correction for the images of such image states, the pixel conversion is made by applying a tone curve, which makes a dark pixel dark and a bright pixel bright, to the "low" contrast image, a tone curve, which makes a rather dark pixel bright and a rather bright pixel dark, to the "high" contrast image, and a tone curve, which does not convert a pixel, to the "normal" image.

In the case of FIGS. 33A to 33C, tone curves as shown at the lower stages are applied. With respect to the "low" contrast image as shown in FIG. 33A, a rather dark pixel is made darker and a rather bright pixel is made brighter by an S-shaped tone curve. With respect to the "normal" image as shown in FIG. 33B, a straight tone curve not to make the pixel conversion is used. With respect to the "high" contrast image as shown in FIG. 33C, a rather dark pixel is made bright and a rather bright pixel is made dark by a reversely S-shaped tone curve. In this embodiment, in the calculation of the lightness standard deviation σ, by taking the reference importance level set by the main portion estimation unit 204 into consideration, the standard deviation σ of the lightness is calculated. That is, the calculation is made in accordance with the following expression.

$$\sigma = \sum_{m=1}^{9} \left( \frac{\sigma_m \times Rm}{\sum_{n=1}^{9} Rn} \right) \quad (25)$$

When image states are checked as to a plurality of general images, the "dark" image is often the "low" contrast image, the "normal" lightness image is the "high", "normal" or "low" contrast image, and the "bright" image is often the "low" contrast image. From this, it is conceivable that the lightness average value μ correlates with the standard deviation σ of the lightness. Then, as a method of determining the image state, a combination of the image state, the lightness average value μ and the standard deviation σ of the lightness, which correspond to the image state, and the tone curve (actually, parameters for determining the tone curve shape) applied to the correction of this image state is determined in advance, and further, a probability function of a two-dimensional normal distribution is prepared by the two variables of μ and σ. Then, with respect to the process image in which it is desired to determine the image state, μ and σ are calculated by the abode-described expressions, these are inputted to the two-dimensional normal distribution function of each image state, and the image state of the process image is expressed by probability values. If a high probability value is obtained, the reliability that the process image has the image state is high, and if a low probability is obtained, the reliability that the process image has the image state is low. The state of the process image may be expressed by the probability value of each image state, or the image state having the highest probability is selected and this may be determined to be the image state of the process image.

With respect to the tone correction, the image state probability value of the process image and the parameter values of the corresponding tone curve shape are subjected to product-sum calculation to determine a tone curve, or a tone curve of an image state having the highest probability is uniquely selected and determined. Then, the tone conversion processing is carried out by using the determined tone curve.

As expressed by the expression (24) and the expression (25), in this embodiment, μ and σ of the process image are not calculated from the pixels of the whole image, but the image is divided into the plurality of small regions Am, μm and σm are calculated for every small region, and a calculation is made by using these and the reference importance level Rm obtained by the main portion estimation processing. That is, the lightness average value μm (=La) of each of the small regions Am and the reference importance level Rm of the small region Am are subjected to the product-sum calculation, so that the average lightness μ of the process image is calculated. Besides, the standard deviation σm of the lightness of each of the small regions Am and the reference importance level Rm of the small region are subjected to the product-sum calculation, so that the standard deviation σ of the lightness of the process image is calculated.

By doing so, the lightness average value and the standard deviation of the lightness as to a more important small region exert a great influence on the calculation of μ and σ, and a tone curve suitable for the important small region in which the reference importance level has a large value is determined. Accordingly, the high quality tone correction can be carried out.

5. Statistical Information Calculation Processing

In order to prepare a color saturation reference value and a contour reference value used for processing by the correction back-end unit 395, the following processing is carried out in advance by the statistical information calculation unit 393.

The statistical information calculation processing will be described with reference to FIGS. 34 to 37. Here, an image obtained by carrying out the correction processing by the correction front-end unit 391 is called a front-end corrected image, and an image obtained by carrying out the image correction by the operator himself is called a manually corrected image. Hereinafter, a description will be given in accordance with a processing flow shown in FIG. 34.

Figures 34, 35:
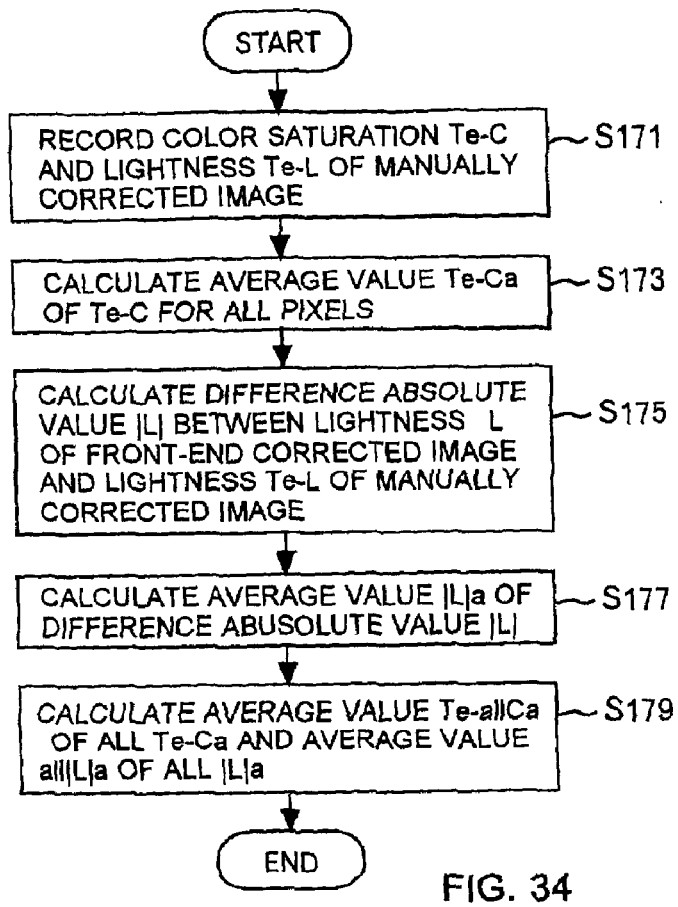
FIG. 34 is a flowchart showing a processing flow of a statistical information calculation.
FIG. 35 is a flowchart showing an example of a manual correction pixel table for a statistical information calculation processing.

First, the statistical information calculation unit 391 obtains the manually corrected image prepared by the operator, and records values of color saturation Te—C and lightness Te—L as to the respective pixels of the manually corrected image into a manual correction pixel table (step S171). FIG. 35 shows an example of the manual correction pixel table. In the example of FIG. 35, there are provided a column 3500 of a pixel identifier, a column 3501 of lightness (Te—L), a column 3502 of color saturation (Te—C), and a column 3503 of a difference absolute value |L| of lightness between a pixel of a front-end corrected image and a pixel of a manually corrected image. At step S171, data of each pixel are registered in the pixel identifier column 3500, the lightness column 3501, and the color saturation column 3502.

Next, the statistical information calculation unit 391 calculates an average value Te—Ca of the color saturation (Te—C) as to all the pixels (step S173). By adding all the data of the color saturation column 3502 of the manual correction pixel table and dividing the result by the number of pixels, the average value Te—Ca of the color saturation is calculated. The calculated average value Te—Ca of the color saturation is stored in a manual correction historical table. FIG. 36 shows an example of the manual correction historical table. In the example of FIG. 36, there are provided a column 3600 of a history number, a column 3601 of an average value Te—Ca of color saturation Te—C, and a column 3602 of an average value |L|a of a difference absolute value |L| of lightness. Here, a new record (line) is created in the manual correction historical table, a next history number is registered in the history number column 3600, and the calculated average value Te—Ca of the color saturation is registered in the column 3601 of the average Te—Ca of the color saturation Te—C.

Then, the statistical information calculation unit 391 obtains the front-end corrected image as to the same image as the manually corrected image, and as to each pixel of the front-end corrected image, the statistical information calculation unit 391 calculates a lightness difference absolute value |L| between the lightness L of the pixel and the lightness Te—L of the corresponding pixel of the manually corrected image (step S175) For example, from the pixel table as to the front-end corrected image as shown in FIG. 17, the data of each pixel is obtained, and the lightness L of each pixel is calculated. If a value of lightness of each pixel is already registered in the pixel table, the data is merely read out. Then, the lightness Te—L as to the corresponding pixel is read out from the lightness column 3501 of the manual correction pixel table, and the difference absolute value |L| of lightness is calculated. The calculated difference absolute value |L| of lightness is registered in the column 3503 of a difference absolute value |L| of lightness in the manual correction pixel table.

Besides, the statistical information calculation unit 391 calculates the average value |L|a of the difference absolute value |L| of lightness (step S177). By adding all data of the column 3503 of the difference absolute value of lightness in the manual correction pixel table and dividing the result by the number of pixels, the average |L|a of the difference absolute value of lightness is calculated. The calculated average |L|a of the difference absolute value is registered in the column 3602 of the average value |L|a of the difference absolute value |L| of the lightness at the line of the history number of this time in the manual correction historical table. The data of this manual correction historical table is registered in the reference value DB 33.

Then, in the case where a certain number of records are registered in the manual correction historical table, automatically or in accordance with the instruction of the operator, a color saturation reference value Te—allCa as an average value of all average color saturation values Te—Ca, and a contour reference value all |L|a as an average value of the average values |L|a of all difference absolute values of lightness are calculated, and are registered in the reference value DB 33 (step S179). By adding all data registered in the column 3601 of the color saturation average value in the manual correction historical table are added, and dividing result by the number of records of the manual correction historical table, the color saturation reference value Te—allCa as the average value of the average color saturation can be obtained. Besides, by adding all data registered in the column 3602 of the difference absolute value of lightness in the manual correction historical table, and dividing the result by the number of records of the manual correction historical table, the contour reference value all |L|a as the average of the average value |L|a of the difference absolute value of lightness can be obtained. These are once stored in a color saturation/contour reference value table, and then, they are registered in the reference value DB 33. FIG. 37 shows an example of the color saturation/contour reference value table. In the example of FIG. 37, a column 3700 of a color saturation reference value Te—allCa and a column 3701 of a contour reference value all |L|a are provided.

The calculated color saturation reference value Te—allCa expresses a statistical color saturation degree preferred by the operator, and the contour reference value all |L|a expresses a statistical contour emphasis degree preferred by the operator when the contour emphasis is carried out to the front-end corrected image. These reference values are used in a color saturation correction processing and a contour emphasis processing described below.

6. Color Saturation Correction Processing

A color saturation correction in this embodiment is carried out in the form reflecting the preference and tendency of the operator. Hereinafter, the processing content of the color saturation correction unit 208 in the correction back-end unit 395 will be described with reference to FIGS. 38 to 40.

Figure 38:
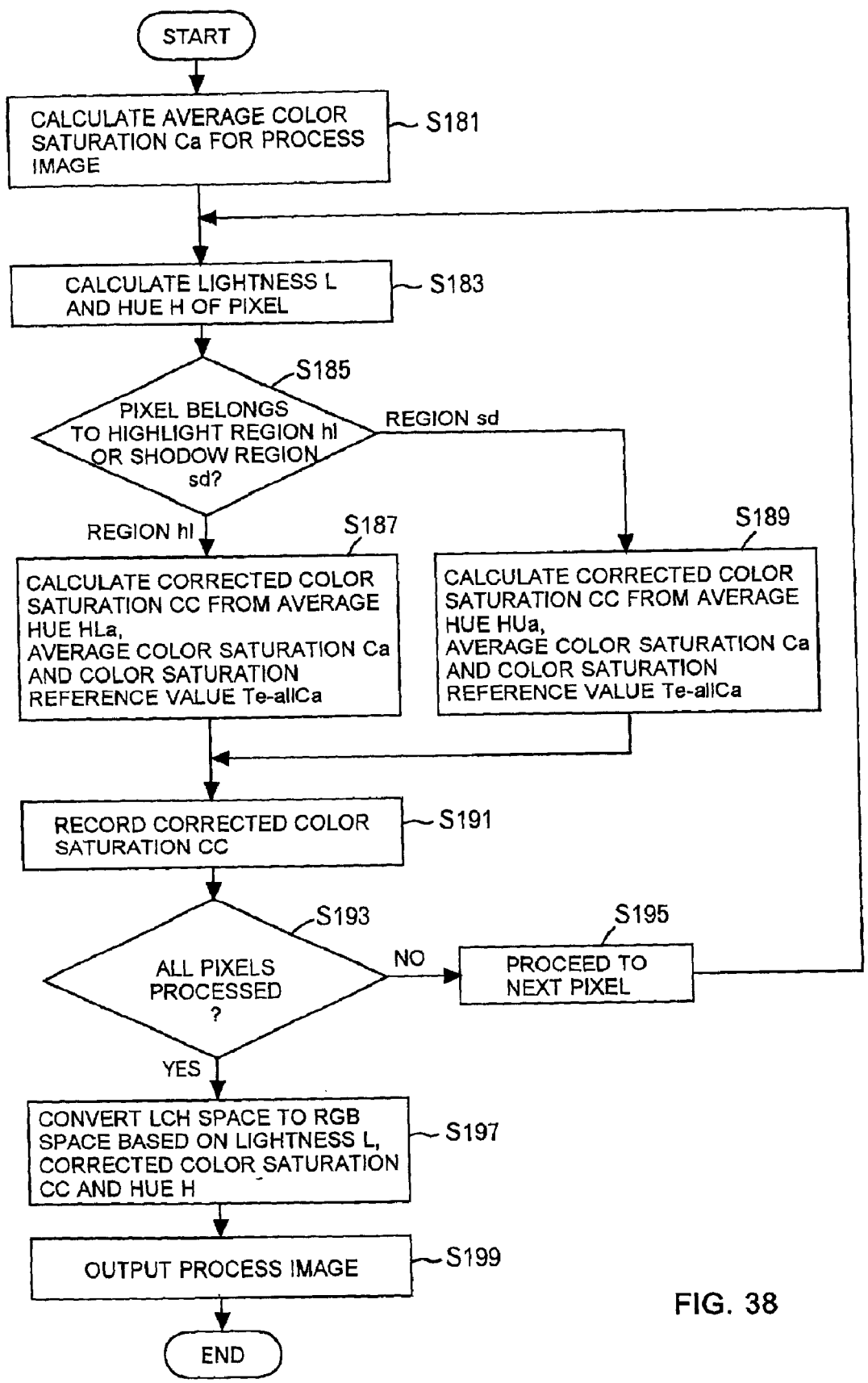
FIG. 38 is a flowchart showing a processing flow of a color saturation correction.

FIG. 38 is a processing flow of the color saturation correction. First, the color saturation correction unit 208 obtains the color saturation C of all pixels of the process image to be processed this time, and calculates the average color saturation Ca (step S181). In the case where the color saturation C has not been calculated as to the respective pixels of the process image, for example, the color saturation C is calculated from the level values of red (R), green (G) and blue (B) of each pixel registered in the pixel table, and by adding the color saturations C of all the pixels to each other and dividing the result by the number of pixels, the average color saturation Ca can be obtained. In the case where values of the color saturation C are already calculated and are stored in the pixel table, those are read out and only the average color saturation Ca is calculated.

Figure 39:
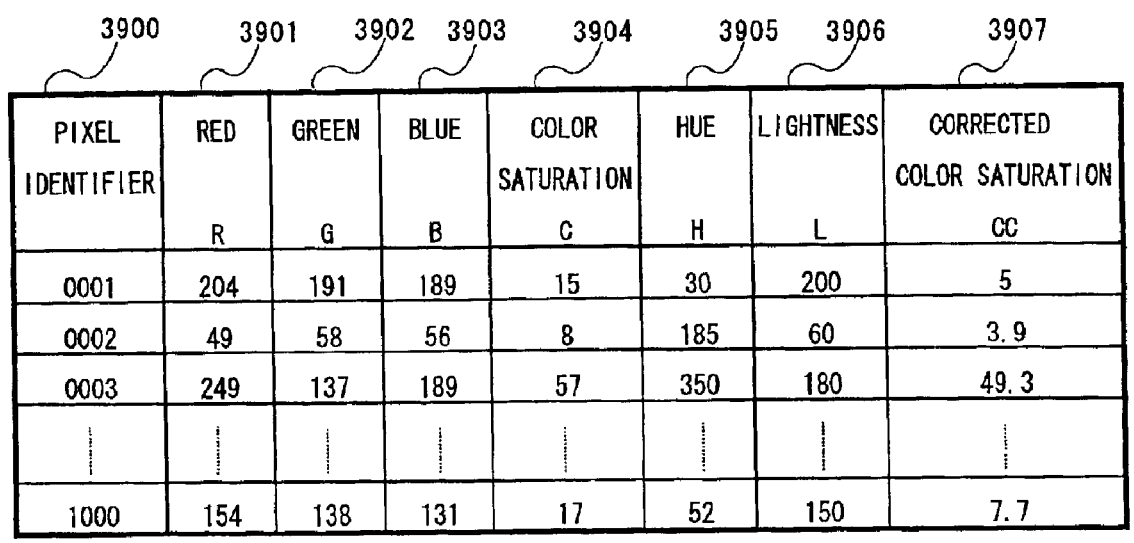
FIG. 39 is a flowchart showing an example of a pixel table for the color saturation correction processing.

FIG. 39 shows an example of the pixel table. In the example of FIG. 39, there are provided a pixel identifier column 3900, a red column 3901 for storing a level value of red (R), a green column 3902 for storing a level value of green (G), a blue column 3903 for storing a level value of blue (B), a color saturation column 3904 for storing a value of color saturation C, a hue column 3905 for storing a value of hue H, a lightness column 3906 for storing a value of lightness, and a corrected color saturation column 3907 for storing color saturation CC corrected by the color saturation correction processing.

At this step, the level values of red, green and blue of each pixel are read out from the red column 3901, the green column 3902, and the blue column 3903, and the color saturation C is calculated and is registered in the color saturation column 3904 of the pixel. Besides, the average color saturation Ca obtained by adding the color saturations C of all the pixels stored in the color saturation column 3904 and dividing the result by the number of pixels is stored into the storage device.

Next, the color saturation correction unit 208 calculates the lightness L and the hue H of a certain pixel to be processed (step S183). The record (line) as to the pixel in the pixel table is read out, and the lightness L and the hue H are calculated. Then, the calculated lightness L and hue H are registered in the lightness column 3806 and the hue column 3905 at the line of the pixel in the pixel table.

Then, in the LCH space as shown in FIG. 7, the color saturation correction unit 208 judges to which of the region hl at the highlight side and the region sd at the shadow side the pixel belongs (step S185). That is, on the basis of the hue range and the lightness range of each region registered in the hue range column 802 and the lightness range column 803 of the maximum color saturation table shown in FIG. 8, it is judged to which region the pixel belongs, and it is judged whether the region is the region hl at the highlight side or the region sd at the shadow side.

If the region belongs to the region hl at the highlight side, the color saturation correction unit 208 uses the average hue HUa, the calculated average color saturation Ca, and the color saturation reference value Te—allCa stored in the reference value DB 33 to calculate the corrected color saturation CC of the pixel (step S187). The corrected color saturation CC is calculated in accordance with the following expression.

$$CC = \left(\frac{\text{Te-allCa}}{Ca} \times C - C\right) \times |\text{Sin}(\theta U)| + C \quad (26)$$

$$CC = \frac{\text{Te-allCa}}{Ca} \times C \quad (27)$$

Incidentally, the expression (26) is an expression for $0 \leq \theta U \leq 90°$, and the expression (27) is an expression for $90° < \theta H \leq 180°$. Where, $\theta U = H - HUa$. As the average hue HUa, a value used in the color balance correction is readout from, for example, the maximum color saturation table (FIG. 8) and is used. In the case where the calculation has not been made, in accordance with the processing flow of FIG. 6, the step S21 to the step S45 (except for the step S43) are carried out as to the process image to prepare the maximum color saturation table, and the average hue is obtained by reading out the value in the average hue column 807 of the maximum color saturation table at the line at which 01 is registered in the maximum pixel count flag column 806.

On the other hand, in the case where the region belongs to the region sd at the shadow side, the color saturation correction unit 208 uses the average hue HLa, the calculated average color saturation Ca, and the color saturation reference value Te—allCa stored in the reference value DB 33 to calculate the corrected color saturation CC of the pixel (step S189). The corrected color saturation CC is calculated in accordance with the following expression.

$$CC = \left(\frac{\text{Te-allCa}}{Ca} \times C - C\right) \times |\text{Sin}(\theta L)| + C \quad (28)$$

$$CC = \frac{\text{Te-allCa}}{Ca} \times C \quad (29)$$

Incidentally, the expression (28) is an expression for $0 \leq \theta L \leq 90°$, and the expression (29) is an expression for $90° < \theta H \leq 180°$. Where, $\theta L = H - HLa$. As the average hue HLa, a value used in the color balance correction is readout from, for example, the maximum color saturation table (FIG. 8) and is used. In the case where the calculation has not been made, similarly to the case of HUa, the maximum color saturation table is prepared, and the average hue is obtained by reading out a value in the average hue column 807 of the maximum color saturation table at the line at which 02 is registered in the maximum pixel count flag column 806.

The expressions (26) to (29) are contrived such that the color saturation of the process image approaches the color saturation reference value of the reference value DB, that is, the result of the color saturation correction approaches the preference and tendency of the operator. Besides, with respect to the pixel, which was subjected to the color balance correction, in order to prevent the color fog from being generated again, that is, in order to prevent the correction from being carried out in the color fog direction, the magnitude of this correction is adjusted by a sine value of θL or θH.

Figure 40:
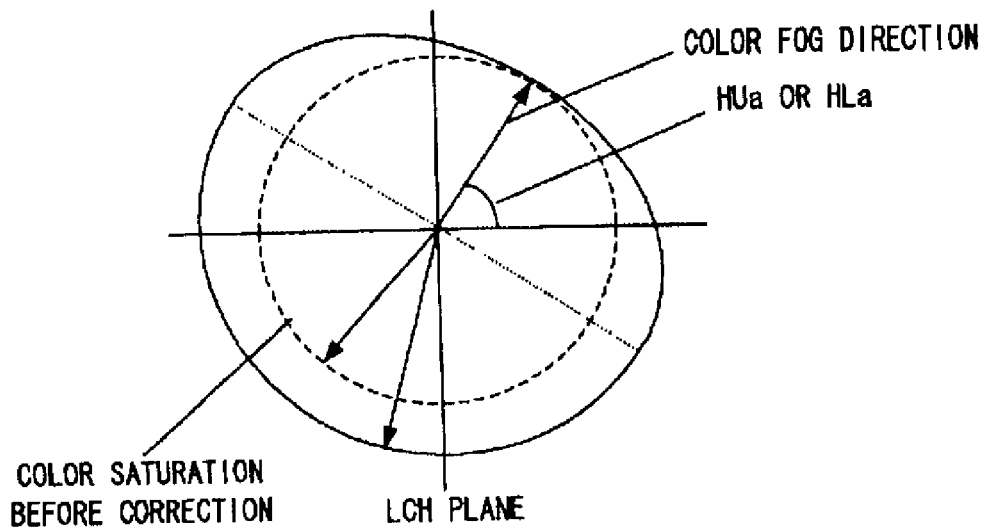
FIG. 40 is a schematic diagram for explaining color saturation distributions before color saturation correction and after the correction.
Figure 44:
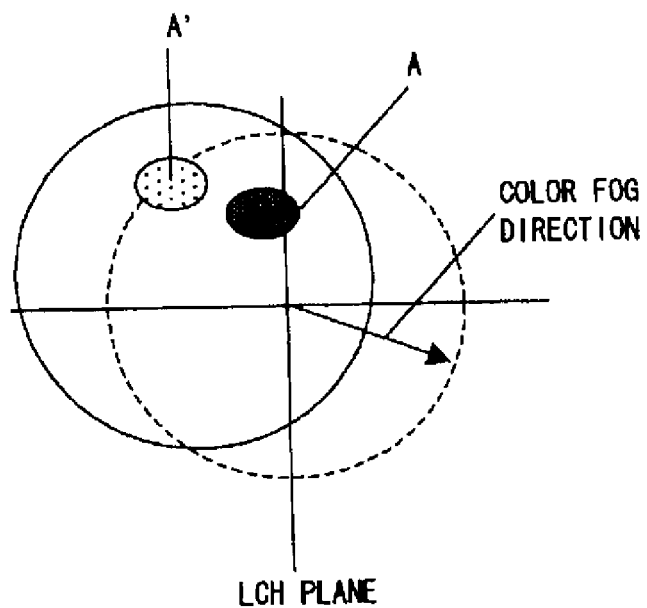
FIG. 44 is a diagram for explaining a color balance correction in a conventional technique.

FIG. 40 schematically shows a state of the color saturation correction. In FIG. 40, a circle of a dotted line indicates a color distribution on an LCH plane before the color saturation correction. On the other hand, a solid line indicates a color distribution on the LCH plane after the color saturation correction. Like this, the correction is not made again in the color fog direction in order to prevent the color fog from being generated again. That is, in the range of plus and minus 90° from the color fog direction, the color saturation correction amount is adjusted by a sine component. Since a range other than that is irrelevant to the color balance correction, the color saturation correction amount is not adjusted.

Then, after the step S187 or the step S189, the color saturation correction unit 208 registers the calculated value of the corrected color saturation CC in, for example, the pixel table (FIG. 39) (step S191). Then, it is judged whether all the pixels are processed (step S193). In case an unprocessed pixel exists, the processing proceeds to the processing of a next pixel (step S195). On the other hand, in the case where all the pixels have been processed, the LCH space is converted to the RGB space on the basis of the lightness L, the corrected color saturation CC, and the hue H, and the respective level values of the RGB are registered in, for example, the pixel table (step S197). Then, the process image is outputted to the image storage DB 35 and is stored (step S199). Incidentally, the process image is not outputted to the image storage DB 35, but may be outputted to the contour emphasis unit 210. In the case where the process image is outputted to the contour emphasis unit 210, the conversion from the LCH space to the RGB space may not be carried out.

According to the color saturation correction as described above, since the color saturation is corrected by using the color saturation reference value Te—allCa expressing the preference and tendency of the operator, the correction of the color saturation desired by the operator can be automatically carried out.

7. Contour Emphasis Correction

Figures 41, 42:
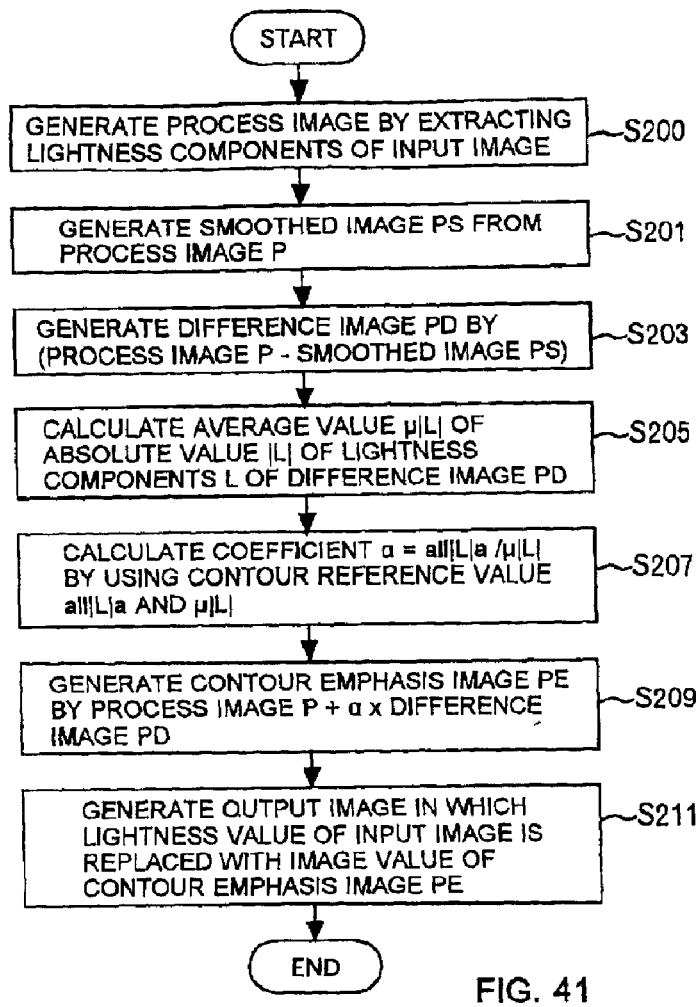
FIG. 41 is a flowchart showing a processing flow of a contour emphasis correction.
FIG. 42 is a diagram showing an example of a pixel table for the contour emphasis correction.

A contour emphasis correction processing by the contour emphasis unit 210 will be described with reference to FIGS. 41 to 43. This embodiment is based on a method generally called an un-sharp mask processing.

The processing will be described in accordance with a processing flow shown in FIG. 41 and a schematic diagram shown in FIG. 43. First, the contour emphasis unit 210 extracts a lightness component of the input image, which was subjected to the color saturation correction by the color saturation correction unit 208 and prepares a process image P (step S200). For example, in the case where only level values of the RGB components of each pixel are obtained, the lightness L is calculated from the level values of the RGB components of the pixel. The calculated lightness L is registered in, for example, a pixel table shown in FIG. 42. In the example of FIG. 42, there are provided a pixel identifier column 4200, a process image column 4201 for storing a lightness value of the process image P, a smoothed image column 4202 for storing a lightness value of a smoothed image PS, a difference image column 4203 for storing a lightness value of a difference image PD, and a contour emphasis image column 4204 for storing a lightness value of a contour emphasis image PE. The lightness L calculated at the step S200 is registered in the process image column 4201 of the pixel table. In the case where the lightness L of the input image has already been calculated, for example, in the case where, as shown in FIG. 39, the information in the pixel table used by the color saturation correction unit 208 can be used as it is, the data of the lightness column 3906 of the pixel table (FIG. 39) is read out and is registered in the process image column 4201 of the pixel table (FIG. 42).

Next, the contour emphasis unit 210 prepares the smoothed image PS of the process image P (step S201). If a smoothing filter operation is carried out for the process image P by using a predetermined smoothing filter, the smoothed image PS can be obtained. Since the smoothing filter operation is a normally used method, it is not described here any more. The pixel value of the smoothed image PS is registered in the column 4202 of the smoothed image PS in the pixel table (FIG. 42).

Figure 43:
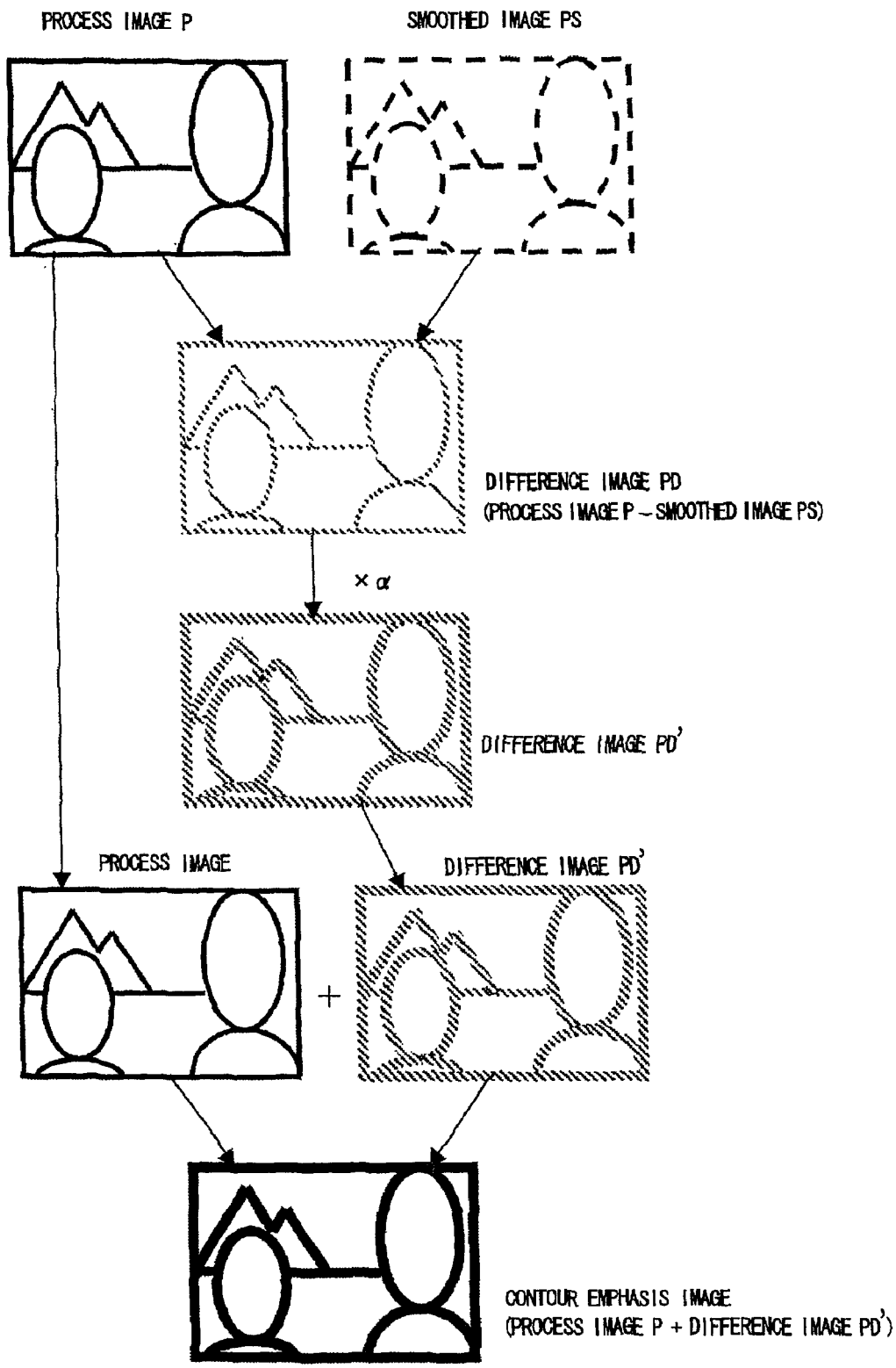
FIG. 43 is a schematic diagram for explaining the contour emphasis correction.

At this point, the process image P and the smoothed image PS shown at the uppermost stage of FIG. 43 are prepared.

The contour emphasis unit 210 subtracts the pixel value of the smoothed image PS from the corresponding pixel value of the process image P to prepare the difference image PD (step S203). That is, a value of a certain pixel of the process image P is subtracted by a pixel value of the corresponding pixel of the smoothed image PS so that a pixel value of each pixel of the difference image PD is obtained. The obtained pixel value is registered in the difference image column 4203 of the pixel table of FIG. 42. The difference image PD shown at the second stage of FIG. 43 is generated.

Next, the contour emphasis unit 210 calculates an average value $\mu|L|$ of the absolute value of the pixel value L of the difference image PD, and stores it into the storage device (step S205). This calculation can be made by adding all values of the difference image column 4203 of the pixel table (FIG. 42) and dividing the sum by the number of pixels. Then, a coefficient α is calculated by using the contour reference value all$|L|$a and $\mu|L|$ stored in the reference value DB 33 through the following expression and is stored into the storage device (step S207).

$$\alpha = all|L|a/\mu|L| \quad (30)$$

For example, if $\mu|L|=2$ and all$|L|$a=4, then α=2.

The contour emphasis unit 210 uses the coefficient α, the pixel value of the process image P, and the pixel value of the difference image PD to carry out the following calculation with respect to the respective corresponding pixels, and generates the contour emphasis image PE (step S209).

$$PE = P + \alpha \times PD \quad (31)$$

The pixel value of each pixel of the process image P is added with a value obtained by multiplying the pixel value of the corresponding pixel of the difference image PD by the coefficient α. The pixel value of each pixel of the process image P is read out from the process image column 4201 of the pixel table (FIG. 42), and the pixel value of each pixel of the difference image PD is read out from the difference image column 4203. The respective calculated pixel values of the contour emphasis image PE are registered in the contour emphasis image column 4204 of the pixel table (FIG. 42). In FIG. 43, the state (difference image PD') in which the difference image PD is multiplied by the coefficient α is shown at the third stage. The addition of the process image P and the difference image PD' is shown at the fourth stage, and the generated contour emphasis image PE is shown at the final stage.

The expressions (30) and (31) are contrived such that the contour emphasis degree of the input image approaches the contour reference value all $|L|$a of the reference value DB 33 and the contour correction result approaches the preference and tendency of the operator.

Finally, the output image in which the lightness value of the input image is replaced by the pixel value of the contour emphasis image PE is generated and is registered in the image storage DB 35 (step S211). For example, in the case where the information in the pixel table used by the color saturation correction unit 208 as shown in FIG. 39 can be used as it is, the data of the hue column 3905 and the data of the color saturation column 3904 of the pixel table (FIG. 39), and the data of the contour emphasis image column 4204 of the pixel table (FIG. 42) are read out, the data of the respective components of the RGB are calculated with respect to each pixel, and the result is registered in the image storage DB 35.

In a conventional system, in order to determine an optimum correction coefficient (coefficient α), the operator compares resultant images of contour emphasis by a plurality of correction coefficients with one another, it takes a long time to determine the correction coefficient. Besides, in some image, the determined correction coefficient does not become optimum, and there is also a case where the correction of sharpness desired by the operator can not be carried out. On the other hand, according to this embodiment, the contour reference value all$|L|$a adapted to the preference of the operator is used, and the optimum correction coefficient α is calculated for every pixel to carry out the contour emphasis, so that the correction of the sharpness desired by the operator can be automatically carried out in a short time.

Although the embodiment of the present invention has been described, the present invention is not limited to this. For example, although the color balance correction, the range correction, the main portion estimation, the tone correction, the color saturation correction, and the contour emphasis correction are described as a series of processings, these can be separately carried out. Besides, although the various tables are used in the above description, the contents of the data stored in these tables and the table structure are merely examples, and other data can be further stored, or necessary data can be limited, or another table structure can be adopted.

The system configuration shown in FIG. 1 is also an example, and for example, such a configuration may be adopted that all devices are connected to one computer, and the operator operates the computer. That is, the devices, such as the image input controller 9, the plotter controller 11, the image correction terminal 5, and the instruction terminal 7, do not exist, and the digital camera 91, the scanner 93, and the plotter 111 (or another printing device) are connected to the computer functioning similarly to the image data server.

As described above, the present invention can provide a novel image correcting technique for automatically carrying out a suitable image correction.

Besides, the present invention can provide a novel image correcting technique for automatically carrying out a more accurate image correction.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for correcting a color fog for an input image, said method comprising the steps of:

calculating a statistical amount with respect to color saturation components of at least one group of pixels included in a reference hue region of a plurality of hue regions generated by dividing a hue given as a correction reference value of said color fog, said color saturation being weighted by values of lightness components of said at least one group of pixels; and correcting said color fog by using said correction reference value with respect to each pixel of said input image.

2. The method as set forth in claim 1, wherein said reference hue region is a hue region in which most pixels of said input image are included.

3. The method as set forth in claim 1, wherein each of said plurality of hue regions is divided into a first region of a high lightness region and a second region of a low lightness region on the basis of a lightness value of a color having maximum color saturation in each said hue region, and said reference hue regions are a region among said first regions of all said hue regions, in which most pixels of said input image are included, and a region among said second regions of all said hue regions, in which most pixels of the input image are included.

4. The method as set forth in claim 1, further comprising a step of calculating a statistical amount with respect to hue of said at least one group of pixels included in said reference hue region as a hue reference value of said color fog, and said correcting step comprises a step of adjusting said correction reference value on the basis of said hue reference value.

5. The method as set forth in claim 4, wherein, in said adjusting step, said correction reference value is adjusted in accordance with a cosine value of a difference between a hue value of each pixel of said input image and said hue reference value.

6. The method as set forth in claim 1, wherein the weighting is performed such that as a difference with a lightness value of a color having maximum color saturation in said reference hue region becomes large, the weight becomes heavy.

7. A method for correcting a color fog for an input image, said method comprising the steps of:

calculating a statistical amount with respect to hue values of at least one group of pixels included in a reference hue region of a plurality of hue regions generated by dividing a range of hue as a hue reference value of said color fog;

calculating a statistical amount with respect to color saturation components of said at least one group of pixels included in said reference hue region in accordance with a predetermined method as a correction reference value of said color fog; and correcting said color fog with respect to each pixel of said input image by using said correction reference value adjusted by using said hue reference value.

8. The method as set forth in claim 7, wherein, in said correcting step, said correction reference value is adjusted in accordance with a cosine value of a difference between a hue value of each pixel of said input image and said hue reference value.

9. A program embodied on a medium, for causing a computer to correct a color fog for an input image, said program comprising the steps of:

calculating a statistical amount with respect to color saturation components of at least one group of pixels included in a reference hue region of a plurality of hue regions generated by dividing a hue given as a correction reference value of said color fog, said color saturation being weighted by values of lightness components of said at least one group of pixels; and correcting said color fog by using said correction reference value with respect to each pixel of said input image.

10. The program as set forth in claim 9, wherein said reference hue region is a hue region in which most pixels of said input image are included.

11. The method as set forth in claim 9, wherein each of said plurality of hue regions is divided into a first region of a high lightness region and a second region of a low lightness region on the basis of a lightness value of a color having maximum color saturation in each said hue region, and said reference hue regions are a region among said first regions of all said hue regions, in which most pixels of said input image are included, and a region among said second regions of all said hue regions, in which most pixels of the input image are included.

12. The program as set forth in claim 9, further comprising a step of calculating a statistical amount with respect to hue of said at least one group of pixels included in said reference hue region as a hue reference value of said color fog, and said correcting step comprises a step of adjusting said correction reference value on the basis of said hue reference value.

13. The program as set forth in claim 12, wherein, in said adjusting step, said correction reference value is adjusted in accordance with a cosine value of a difference between a hue value of each pixel of said input image and said hue reference value.

14. The program as set forth in claim 9, wherein the weighting is performed such that as a difference with a lightness value of a color having maximum color saturation in said reference hue region becomes large, the weight becomes heavy.

15. A program embodied on a medium, for causing a computer to correct a color fog for an input image, said program comprising the steps of:

calculating a statistical amount with respect to hue values of at least one group of pixels included in a reference hue region of a plurality of hue regions generated by dividing a range of hue as a hue reference value of said color fog;

calculating a statistical amount with respect to color saturation components of said at least one group of pixels included in said reference hue region in accordance with a predetermined method as a correction reference value of said color fog; and correcting said color fog with respect to each pixel of said input image by using said correction reference value adjusted by using said hue reference value.

16. The program as set forth in claim 15, wherein, in said correcting step, said correction reference value is adjusted in accordance with a cosine value of a difference between a hue value of each pixel of said input image and said hue reference value.

17. An apparatus for correcting a color fog for an input image, comprising:
- a calculator for calculating a statistical amount with respect to color saturation components of at least one group of pixels included in a reference hue region of a plurality of hue regions generated by dividing a hue given as a correction reference value of said color fog, said color saturation being weighted by values of lightness components of said at least one group of pixels; and
- means for correcting said color fog by using said correction reference value with respect to each pixel of said input image.

18. The apparatus as set forth in claim 17, wherein said reference hue region is a hue region in which most pixels of said input image are included.

19. The apparatus as set forth in claim 17, wherein
- each of said plurality of hue regions is divided into a first region of a high lightness region and a second region of a low lightness region on the basis of a lightness value of a color having maximum color saturation in each said hue region, and
- said reference hue regions are a region among said first regions of all said hue regions, in which most pixels of said input image are included, and a region among said second regions of all said hue regions, in which most pixels of the input image are included.

20. The apparatus as set forth in claim 17, further comprising a second calculator for calculating a statistical amount with respect to hue of said at least one group of pixels included in said reference hue region as a hue reference value of said color fog, and
- said means for correcting comprises an adjuster for adjusting said correction reference value on the basis of said hue reference value.

21. The apparatus as set forth in claim 20, wherein said means for adjusting adjusts said correction reference value in accordance with a cosine value of a difference between a hue value of each pixel of said input image and said hue reference value.

22. The apparatus as set forth in claim 17, wherein the weighting is performed such that as a difference with a lightness value of a color having maximum color saturation in said reference hue region becomes large, the weight becomes heavy.

23. An apparatus for correcting a color fog for an input image, comprising:
- a first calculator for calculating a statistical amount with respect to hue values of at least one group of pixels included in a reference hue region of a plurality of hue regions generated by dividing a range of hue as a hue reference value of said color fog;
- a second calculator for calculating a statistical amount with respect to color saturation components of said at least one group of pixels included in said reference hue region in accordance with a predetermined method as a correction reference value of said color fog; and
- means for correcting said color fog with respect to each pixel of said input image by using said correction reference value adjusted by using said hue reference value.

24. The apparatus as set forth in claim 23, wherein said means for correcting adjusts said correction reference value in accordance with a cosine value of a difference between a hue value of each pixel of said input image and said hue reference value.

* * * * *